US006825889B1

(12) United States Patent
Saito et al.

(10) Patent No.: US 6,825,889 B1
(45) Date of Patent: Nov. 30, 2004

(54) LIQUID CRYSTAL DEVICE WITH AN OFFSET TOWARD A CLEAR VIEWING DIRECTION AND PROJECTION TYPE DISPLAY DEVICE USING THE LIQUID CRYSTAL DEVICE

(75) Inventors: Hiromi Saito, Chino (JP); Ken Inoue, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/601,195

(22) PCT Filed: Nov. 26, 1999

(86) PCT No.: PCT/JP99/06641

§ 371 (c)(1),
(2), (4) Date: Jul. 28, 2000

(87) PCT Pub. No.: WO00/33130

PCT Pub. Date: Jun. 8, 2000

(30) Foreign Application Priority Data

| Nov. 30, 1998 | (JP) | ............................................ 10-339606 |
| Feb. 26, 1999 | (JP) | ............................................ 11-050675 |

(51) Int. Cl.[7] ............................................. G02F 1/1335
(52) U.S. Cl. ........................................................... 349/5
(58) Field of Search ............................................... 349/5

(56) References Cited

U.S. PATENT DOCUMENTS

| 5,561,538 A | * | 10/1996 | Kato et al. ...................... 349/5 |
| 5,764,318 A | * | 6/1998 | Kurematsu et al. ............. 349/5 |
| 5,844,644 A | * | 12/1998 | Oh et al. ........................ 349/95 |
| 5,969,832 A | * | 10/1999 | Nakanishi et al. ........... 349/108 |
| 6,193,376 B1 | * | 2/2001 | Hayashi et al. ................ 353/30 |
| 6,195,143 B1 | * | 2/2001 | Ogawa .......................... 349/95 |
| 6,437,764 B1 | * | 8/2002 | Suzuki et al. ................. 345/87 |

FOREIGN PATENT DOCUMENTS

| JP | 62-003227 | 1/1987 |
| JP | 64-30978 | 2/1989 |
| JP | 64-080988 | 3/1989 |
| JP | 02-251902 | 10/1990 |
| JP | 04-134321 | 5/1992 |
| JP | 05-232461 | 9/1993 |
| JP | 06-11031 A | 4/1994 |
| JP | 06-110031 | 4/1994 |
| JP | 07-120743 | 5/1995 |
| JP | 07-120743 A | 5/1995 |
| JP | 09-043587 | 2/1997 |
| JP | 11-311802 | 11/1999 |
| JP | 11-311802 A | 11/1999 |
| JP | 2000-075259 | 3/2000 |

* cited by examiner

Primary Examiner—Robert H. Kim
Assistant Examiner—P. R. Akkapeddi
(74) Attorney, Agent, or Firm—Oliff & Berridge, PLC

(57) ABSTRACT

In a liquid crystal device and a projection display device using the liquid crystal device as a light valve, for the purpose of preventing light incident from opposite the clear viewing direction from affecting the display, in a liquid crystal device (1), an optical center position (411) of a microlens (41) formed on a counter substrate (30) is offset toward the clear viewing direction as viewed from a center position (211) of a first opening area (21) formed for each pixel on the side of an active matrix substrate (20). For this reason, light incident on the counter substrate (30) from the direction inclined in the clear viewing direction is emitted from the active matrix substrate (20); however, light incident from the direction inclined opposite to the clear viewing direction that causes the degradation of contrast is not emitted from the active matrix substrate (20) and does not affect the display.

32 Claims, 30 Drawing Sheets

Fig. 29
RELATED ART
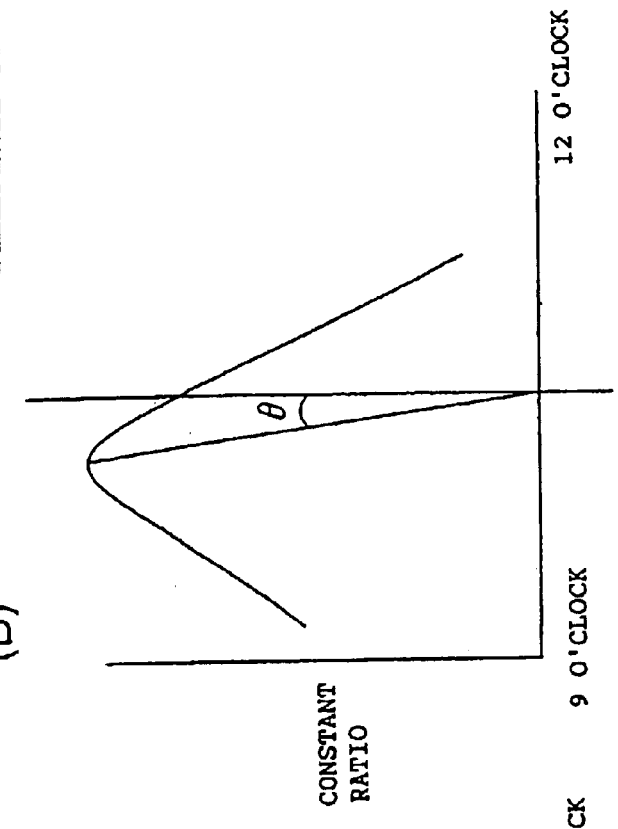
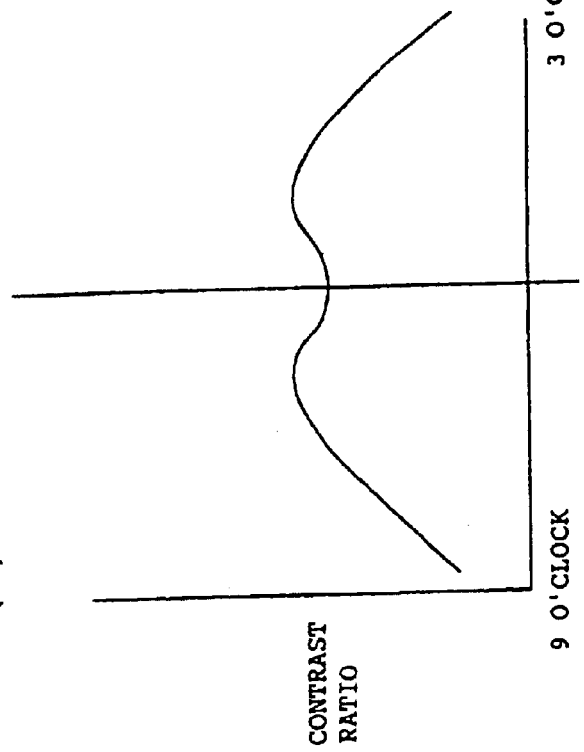
θ : INCLINATION TOWARD CLEAR VIEWING DIRECTION

US 6,825,889 B1

LIQUID CRYSTAL DEVICE WITH AN OFFSET TOWARD A CLEAR VIEWING DIRECTION AND PROJECTION TYPE DISPLAY DEVICE USING THE LIQUID CRYSTAL DEVICE

BACKGROUND OF THE INVENTION

1. Field of the Invention

The present invention relates to a liquid crystal device in which the liquid crystal sealed between a pair of substrates is twist-aligned between the substrates, and to a projection display device using the liquid crystal device as a light valve. More specifically, the present invention relates to a contrast improvement technology in a display device using a liquid crystal device.

2. Background Art

A liquid crystal device of a type in which the liquid crystal sealed between a pair of substrates (TN liquid crystal/liquid crystal of a twisted nematic mode) is twist-aligned between the substrates is installed in, for example, a projection display device as a light valve. In general, in the projection display device of this type, for example, lights of the three primary colors red, blue, and green pass through liquid crystal devices to form an image component for each color, these image components are combined to create a desired color image, and the color image is projected.

The configuration of a conventional liquid crystal device used in such a display device will be described with reference to FIG. 27.

FIG. 27 is an enlarged sectional view of an active matrix substrate, a counter substrate, and a bonding structure of these substrates.

As shown in FIG. 27, a liquid crystal device 1 is generally composed of an active matrix substrate 20 formed with a transparent pixel electrode 8, an alignment layer 46, a pixel-switching thin film transistor (hereinafter, referred to as a "TFT") (not shown), a data line (not shown), a scanning line 91, and a capacitor line 92; a counter substrate 30 formed with a transparent counter electrode 32 and an alignment layer 47; and liquid crystal 39 sealed and sandwiched between these substrates. As the liquid crystal 39 to be sealed, liquid crystal of a TN (twisted nematic) mode that is twist-aligned 90° by the alignment layers 46 and 47 between the substrates has been widely used. According to the thus-configured liquid crystal device 1, in the active matrix substrate 20, an alignment state of the liquid crystal 39 can be controlled between the pixel electrode 8 and the counter electrode 32 by image signals applied on the pixel electrode 8 from the data line via the TFT. Therefore, in the transmissive liquid crystal device 1, light incident from the side of the counter substrate 30 enters the liquid crystal 39 from the side of the counter substrate after being arranged in predetermined linear polarized light beams by an incident-side polarizer (not shown). A linear polarized light beam passing through a certain area is emitted from the active matrix substrate 20 with a transmitted light polarization axis twisted, whereas a linear polarized light beam passing through another area is emitted from the side of the active matrix substrate 20 without twisting of a transmitted light polarization axis. Therefore, either one of the linear polarized light beam whose transmitted light polarization axis is twisted by the liquid crystal 39, or the linear polarized light beam whose transmitted light polarization axis is not twisted by the liquid crystal 39 passes through an emitting-side polarizer (not shown). Thus, by controlling polarization states of these beams for every pixel, predetermined information can be displayed.

SUMMARY OF THE INVENTION

When the light incident from the side of the counter substrate 30 enters into a channel area of the TFT, or is reflected by the channel area of the TFT, not only does such light not contribute to display, but also a photoelectric current is generated by a photoelectric conversion effect, resulting in deterioration of transistor characteristics of the TFT. For this reason, the active matrix substrate 20 and the counter substrate 30 may be formed with a black matrix consisting of a metallic material, such as chrome, and a resin black, or a first light-shielding film 6 and a second light-shielding film 7, called a black mask, in such a manner as to overlap areas between adjacent pixel electrodes 8. When configured in this way, according to the liquid crystal device 1, in either of the active matrix substrate 20 and the counter substrate 30, light passes through only first and second opening areas 21 and 31 partitioned by the first light-shielding film 6 and the second light-shielding film 7, and the light is intercepted by the first light-shielding film 6 and the second light-shielding film 7 in other areas. Therefore, it is possible to prevent intense light from entering or from being reflected by the channel area of the TFT 10.

In the thus-configured liquid crystal device 1, the first light-shielding film 6 of the active matrix substrate 20 and the second light-shielding film 7 of the counter substrate 30 are formed on nearly overlapping areas. For this reason, a center position 211 of the first opening area 2 of the active matrix substrate 20 coincides with the center position 311 of the second opening area 2 of the counter substrate 30.

While it is not shown in the figure, in another example of a conventional liquid crystal device, the counter substrate 30 may be formed with a microlens to collect light incident on the liquid crystal device, thereby improving light utilization efficiency. That is, in the example shown in FIG. 27, a part of the incident light which is from the counter substrate 30 is intercepted by the second light-shielding film 7 and does not contribute to display. If the counter substrate 30 is formed with a microlens, however, light intercepted by the second light-shielding film 7 will enter the liquid crystal 39, whereby the amount of light contributing to display is increased.

When the counter substrate 30 is formed with the microlens in this way, by forming the microlens in such a manner that an optical center position of the microlens is superimposed on the center positions 211 and 311 of the opening areas 21 and 31 of the active matrix substrate 20 and the counter substrate 30, a decrease in the amount of light contributing to display can be avoided. Therefore, the liquid crystal device 1 which is highly reliable and is able to effect bright display can be formed.

In the thus-configured liquid crystal device 1, as the alignment state of liquid crystal is schematically shown in FIG. 28, liquid crystal 39 is twist-aligned 90° between an active matrix substrate 20 and a counter substrate 30. In order to show the directions of the substrates 20 and 30, numerals corresponding to the time in a timepiece are assigned in FIG. 28. In order to let the liquid crystal have such a twist of 90°, after forming polyimide layers and the like serving as alignment layers 46 and 47 on the surfaces of the substrates and 30, rubbing treatment is applied to the pair of substrates in the directions perpendicular to each other, as rubbing directions are shown by an arrow A and an arrow and then the substrates 20 and 30 are bonded and the liquid crystal 39 is filled in a gap formed therebetween. As a result, the liquid crystal 39 is aligned with its major axis direction pointing in the rubbing directions of the alignment layers 46 and 47, and the major axis direction of the liquid crystal 39 is twisted 90° between the pair of substrates 20 and 30.

In the liquid crystal device 1 using the thus-twist-aligned liquid crystal 39, contrast characteristics show directivity by the alignment state (the major axis direction and inclination of the major axis) of the liquid crystal 39 located in the middle of the substrates and 30. That is, when the liquid crystal 39 is aligned as shown in FIG. 28, the contrast characteristics of the liquid crystal device 1 in the three o'clock-nine o'clock direction show characteristics of bilateral symmetry with respect to the six o'clock-twelve o'clock direction, as shown in FIG. 29(A). In contrast, as shown in FIG. 29(B), the contrast characteristics in the six o'clock-twelve o'clock direction of this liquid crystal device 1 are such that the contrast is high in the direction of six o'clock, whereas the contrast substantially degrades in directions deviating therefrom. In such a case, the direction of six o'clock is referred to as the "clear viewing direction", and the direction opposite thereto is referred to as "opposite of the clear viewing direction".

Therefore, as shown in FIG. 30, if only light from the clear viewing direction is allowed to enter the liquid crystal device 1, and light from the opposite of the clear viewing direction is prevented from entering, a display with high contrast can be effected. In a projection display device or the like, although light emitted from a light source is made into a collimated light beam in a light guide system, light cannot be prevented from entering the liquid crystal device 1 from a direction inclined toward the opposite of the clear viewing direction with respect to a normal line. As a result, in the conventional liquid crystal device 1, as shown in FIG. 27, of light incident from the side of the counter substrate 30, light incident from the direction inclined toward the opposite of the clear viewing direction is, similarly to light incident from the direction inclined toward the clear viewing direction, is emitted from the first opening area 21 of the active matrix substrate 20 after passing through the layer of the liquid crystal 39. Therefore, in a projection display device using the conventional liquid crystal device 1, since the light incident from the opposite of the clear viewing direction also affects the display, there is a problem of low contrast.

In addition, with the configuration such that the counter substrate 30 is formed with a hemispherical microlens to increase light incident on the liquid crystal device, the amount of light incident from the clear viewing direction can be increased, but the amount of light incident from opposite the clear viewing direction is also increased. For this reason, if the counter substrate 30 is formed with the microlens, the contrast characteristics deteriorate.

In consideration of the foregoing problems, an object of the present invention is to provide a liquid crystal device which is able to improve contrast characteristics by preventing light incident from the direction inclined toward the opposite of the clear viewing direction from affecting the display, and to provide a projection display device using the liquid crystal device as a light valve.

In addition, an object of the present invention is to provide a liquid crystal device which is able to prevent the light incident from the direction inclined toward the opposite of the clear viewing direction from affecting the display and which is able to improve light utilization efficiency, and to provide a projection display device using the liquid crystal device as a light valve.

In order to solve the above problems, the present invention provides a liquid crystal device including a first substrate formed with a plurality of pixels each having a pixel electrode formed thereon; a second substrate opposing the first substrate; and liquid crystal sandwiched between the first and second substrates, wherein the first and second substrates are constructed so as to emit, of the light incident from one substrate, light incident from a clear viewing direction in a larger amount than light incident from opposite the clear viewing direction.

According to the present invention, since the first and second substrates are constructed so as to emit, of the light incident from one substrate, light incident from the clear viewing direction in a larger amount than light incident from opposite the clear viewing direction, even if light inclined opposite to the clear viewing direction enters, such light incident from opposite of the clear viewing direction can be prevented from contributing the display. Therefore, display with high contrast can be effected.

In the present invention, the one substrate may be formed with a light-shielding film in a matrix so as to overlap an area corresponding to an area between the adjacent pixel electrodes.

In the present invention, when preventing the light incident opposite to the clear viewing direction from contributing the display, for example, the first and second substrates are formed with first and second opening areas for each pixel, and, of the first and second opening areas, a center position of the opening area formed in the one substrate is offset toward the clear viewing direction with respect to a center position of the opening area formed in the other substrate from which light is emitted. That is, in the case of a configuration such that the light incident on the second opening area formed in the second substrate is transmitted by the first opening area formed in the first substrate to effect the display, the center position of the second opening area is offset toward the clear viewing direction with respect to the center position of the first opening area In the specification of this application, "center position of an opening area of a pixel" means an intersection of diagonal lines of an area contributing the display of the pixel, or, in the case of a shape such that diagonal lines cannot be specified, the center of gravity of an area contributing the display of the pixel.

In a liquid crystal device having such a configuration, of the light incident on the second opening area formed in the second substrate, light incident from the direction inclined toward the clear viewing direction is emitted from the first opening area formed in the first substrate; however, light incident from the direction inclined toward the opposite of the clear viewing direction which causes the degradation of contrast is illuminated at a position offset from the first opening area with respect to the first substrate, and is prevented from being emitted from the first substrate. Accordingly, even if the light inclined in the clear viewing direction and opposite to the clear viewing direction enters from the second substrate, the light inclined opposite to the clear viewing direction does not affect the display. Therefore, according to the liquid crystal device to which the present invention is applied, display with high contrast can be effected.

In the present invention, for the purpose of improving light efficiency, the one substrate may be formed with a microlens so as to oppose each pixel. In this case, an optical center position of the microlens may be arranged so as to substantially coincide with the center position of the opening area of the one substrate. In contrast, the optical center position of the microlens may also be offset toward the clear viewing direction with respect to a center position of an opening area of the other substrate of the first and second substrates from which light is emitted. In this case, the light offset toward the clear viewing direction is condensed by the microlens and is allowed to enter the liquid crystal, thereby enabling display with high contrast.

In the specification of this application, "optical center position of the microlens" does not mean a geometric center position of the microlens, but means an optical axis, that is, a line connecting centers of curvature of an optical surface of one lens. In addition, "offsetting toward the clear viewing direction" not only means offsetting simply toward the clear viewing direction, but also include offsetting in a direction near any one of upward, downward, leftward, and rightward clear viewing directions. For example, the offsetting direction in the case of a half-after-one clear viewing direction includes an upward or a rightward direction with respect to the substrate, and the offsetting direction in the case of a half-past-ten clear viewing direction includes a downward or a leftward direction.

In the present invention, regardless of the positional relationship between the first and second opening areas, the one substrate may be formed with a microlens so as to oppose each pixel, and the optical center position of the microlens may be offset toward the clear viewing direction with respect to a center position of an opening area of the other substrate of the first and second substrates from which light is emitted. According to such a configuration, since the optical center position of the first microlens is offset toward the clear viewing direction, for example, of the light incident from the side of the second substrate, light incident from the direction inclined in the clear viewing direction is emitted from the opening area of the first substrate even if it is refracted by the first microlens; however, light incident from the direction inclined opposite to the clear viewing direction which causes degradation of contrast is refracted by the first microlens, and then is illuminated on the first substrate at a position offset from the opening area, and is not emitted from the first substrate. Accordingly, even if the light inclined in the clear viewing direction and opposite to the clear viewing direction enters from the side of the second substrate, light inclined opposite to the clear viewing direction does not affect the display. Therefore, according to the liquid crystal device to which the present invention is applied, display with high contrast can be effected only by the configuration such that the optical center position of the microlens is offset toward the clear viewing direction with respect to the center position of the opening area of the pixel.

In the present invention, of the first and second substrates, the other substrate from which light is emitted may preferably be formed with a microlens so as to oppose each pixel. In this case, an optical center position of the microlens formed on the other substrate may preferably be offset toward the clear viewing direction with respect to the center position of the opening area of the one substrate. According to such a configuration, light with high contrast incident via the microlens formed on one substrate can be efficiently emitted by the microlens formed on the other substrate. In addition, the light to be emitted can be converged, collimated, or diffused in accordance with an optical system, so that the opening ratio of the pixel can be substantially increased, and light utilization efficiency can be improved.

In the present invention, the first and second substrates may be formed with first and second light-shielding films formed in a matrix, respectively, so as to overlap an area corresponding to an area between the adjacent pixel electrodes, whereby the first and second opening areas are partitioned and formed in a matrix for each pixel by the first and second light-shielding films.

In this case, of the first and second light-shielding films, the light-shielding film formed on the one substrate may preferably broadly overlap the opening area formed in the other substrate at the side opposite the clear viewing direction compared to the side of the clear viewing direction, whereby, of the first and second opening areas, the center position of the opening areas formed in the one substrate is offset toward the clear viewing direction with respect to the center position of the opening area formed in the other substrate. According to such a configuration, light incident from the clear viewing direction can be transmitted and light from the opposite of the clear viewing direction can be intercepted, so that display with high contrast can be effected.

In the present invention, of the first and second light-shielding films, the light-shielding film formed on the other substrate may preferably broadly overlaps the opening area formed in the one substrate at the side of the clear viewing direction compared to the side opposite the clear viewing direction, whereby, of the first and second opening areas, the center position of the opening area formed in the one substrate is offset toward the clear viewing direction with respect to the center position of the opening area formed in the other substrate. According to such a configuration, light incident from the clear viewing direction can be transmitted and light emitted from the opposite of the clear viewing direction can be intercepted, so that display with high contrast can be effected.

In the present invention, an asymmetric microlens, for emitting a larger amount of light incident on the one substrate from the clear viewing direction to the liquid crystal than the amount of light incident on the one substrate from opposite the clear viewing direction, may preferably be formed in an area of the one substrate opposing each pixel. With this configuration, of the first and second substrates, the microlens is formed on the substrate into which light enters, so that the light incident on the substrate can be emitted to the liquid crystal while being condensed. Accordingly, light utilization efficiency can be improved. In addition, since the microlens having asymmetric optical characteristics is used, the microlens can allow a large amount of the light incident from the clear viewing direction to enter into the liquid crystal, and can decrease the amount of light incident from the opposite of the clear viewing direction. Therefore, light utilization efficiency is high, and display with good contrast characteristics can be effected.

In the present invention, the asymmetric microlens having the following configurations can be used.

In the specification of this application, "the low-refractive index layer, the medium-refractive index layer, and the high-refractive index layer" means that the refractive indexes of the layers satisfies the relationship:

low-refractive index layer<medium-refractive index layer <high-refractive index layer.

As the asymmetric microlens, first, of a high-refractive index layer formed on the side of a light incident surface of the substrate and a low-refractive index layer formed on the side of a light emitting surface of the substrate, a microlens such that the low-refractive index layer is increased in thickness from the center of the pixel toward the clear viewing direction and is reduced in thickness toward the opposite of the clear viewing direction, may be used.

In addition, of a low-refractive index layer formed on the light incident-side of the substrate and a high-refractive index layer formed on the light emitting-side of the one substrate, a microlens such that the high-refractive index layer is reduced in thickness from the center of the pixel toward the clear viewing direction and is increased in thickness toward the opposite of the clear viewing direction, may be used.

Furthermore, of a medium-refractive index layer formed on the light incident-side of the one substrate, a low-refractive index layer formed at the side of the clear viewing direction on the light emitting-side of the substrate, and a high-refractive index layer adjacent to the low-reflective index layer at the side opposite the clear viewing direction on the light emitting-side of the substrate, a microlens such that the low-refractive index layer and the high-refractive index layer are increased in thickness from the center of the pixel toward the clear viewing direction and the opposite of the clear viewing direction, respectively, may be used.

Still furthermore, of a medium-refractive index layer formed on the light incident-side of the one substrate, a high-refractive index layer formed at the side of the clear viewing direction on the light emitting-side of the substrate, and a low-refractive index layer adjacent to the high-reflective index layer at the side opposite the clear viewing direction on the light emitting-side of the substrate, a microlens such that the high-refractive index layer and the low-refractive index layer are reduced in thickness from the center of the pixel toward the clear viewing direction and the opposite of the clear viewing direction, respectively, may be used.

Even if any one of the above configurations is used, a large amount of light incident from the clear viewing direction can be increased and the amount of light incident from opposite of the clear viewing direction can be decreased. Therefore, light utilization efficiency can be improved, and display with good contrast characteristics can be effected.

In this case, it is preferable that on one of the first and second substrates, a microlens substrate including a microlens having a convex shape on an area opposing each pixel, and a flat surface on an area opposing the center of each pixel, and a thin plate bonded to the microlens substrate via a bonding agent be formed, and that the flat surface of the microlens be abutted against the thin plate. That is, the one substrate may preferably include a microlens substrate formed with the microlens, and a thin plate bonded to the microlens substrate via a bonding agent, the microlens may preferably have a convex shape having a flat surface for forming the non-lens area in the center of the pixel, and the microlens substrate and the thin plate may preferably be bonded with the thin plate abutted against the flat surface. According to such a configuration, light travelling toward a light-shielding film or wiring on the pixel peripheral area can be directed to the pixel center. Therefore, light utilization efficiency can be improved and the amount of light incident from the opposite of the clear viewing direction can be decreased, so that display with high contrast can be effected. In addition, since the pixel center area has a flat surface and the microlens is formed only on the pixel peripheral area, radiated light incident on the pixel center area can pass the pixel in a state of divergence in some degree without being condensed on one point of the pixel center of the liquid crystal. Accordingly, the incident light can be prevented from being locally radiated, and the service life of the liquid crystal can be extended. Furthermore, the flat surface of the pixel center area is abutted against the thin plate via the bonding agent, so that it is possible to uniformly control the gap between the thin plate and the microlens substrate including the microlens. Therefore, the microlens array substrate and the thin plate can be bonded accurately.

In the present invention, the first substrate may be formed with a plurality of scanning lines and a plurality of data lines, and the pixel electrode may be connected to the scanning lines and the data lines via a pixel switching element.

In the present invention, the one electrode may be, for example, the second substrate. In this case, it is preferable that the first substrate be formed with a plurality of scanning lines and a plurality of data lines, and the pixel electrode be connected to the scanning lines and the data lines via a pixel switching element, and that the pixel switching element be formed on the side of the clear viewing direction in the pixel with respect to the pixel electrode. In addition, in each pixel, each of the scanning lines corresponding to the pixel, and a capacitor line for forming a storage capacitor, may preferably be formed on the side of the clear viewing direction. In the first substrate, since the opening area is basically formed by removing the area of formation of the pixel switching element from the area partitioned by the data line, the scanning line, and the capacitor line, an area by which light is intercepted is widely formed. That is, since an area through which light does not pass is wide on the side of the formation of the pixel switching element by the amount thereof, if the pixel switching element is formed on the side of the clear viewing direction with respect to the pixel electrode, the light incident from the direction inclined opposite to the clear viewing direction can be intercepted utilizing an area on which the switching element, the scanning line, and the capacitor line are formed. Conversely, the light incident from the clear viewing direction can be prevented from being intercepted by the light-shielding film, the wiring, or the pixel switching element, so that utilization efficiency of light incident from the clear viewing direction can be improved.

Since the liquid crystal device to which the present invention is applied has high contrast characteristics, the liquid crystal device may preferably be used as a light valve of a projection display device. That is, a projection display device using the liquid crystal device according to the present invention may be provided with a light source, a condenser optical system for guiding light emitted from the light source to the liquid crystal, and an enlarging and projecting optical system for enlarging and projecting the light modulated by the liquid crystal device.

In the liquid crystal device in the projection display device of the present invention, it is preferable that light whose optical axis is inclined toward the clear viewing direction with respect to the normal line direction of the liquid crystal device be incident on the liquid crystal device. According to such a configuration, the light inclined toward the clear viewing direction is incident on the substrate, so that contrast can be further improved.

When the projection display device is configured in this way, the optical axis of the light incident on liquid crystal device may preferably be inclined toward the clear viewing direction with respect to the normal line direction of the liquid crystal device.

In the present invention, when inclining the optical axis of the light incident on the liquid crystal device toward the clear viewing direction with respect to the normal line direction of the liquid crystal device, for example, the liquid crystal device is arranged in an oblique position to incline the optical axis of the light incident on the liquid crystal toward the clear viewing direction with respect to the normal line direction of the liquid crystal device. In addition, when inclining the optical axis of the light incident on the liquid crystal device toward the clear viewing direction with respect to the normal line direction of the liquid crystal device, a condenser lens used in the condenser optical system may be arranged in an oblique position to incline the optical axis of the light incident on the liquid crystal toward the clear viewing direction with respect to the normal line direction of the liquid crystal device. Furthermore, a reflecting mirror used in the condenser optical system may be arranged in an oblique position to incline the optical axis of the light incident on the liquid crystal toward the clear viewing direction with respect to the normal line direction of the liquid crystal device. That is, even if only the microlens or the internal structure of the liquid crystal device is insufficient for allowing light to enter the liquid crystal only from the clear viewing direction, such insufficiency may be covered by the inclination of the liquid crystal device, the inclination of the condenser lens or the reflecting mirror in the condenser optical system.

In the present invention, a plurality of the liquid crystal devices may be used. In this case, an angle of the optical axis of the incident light inclined with respect to the normal line direction of the liquid crystal device may preferably be set to an optimum value for each of the plurality of liquid crystal devices.

Figure 18:
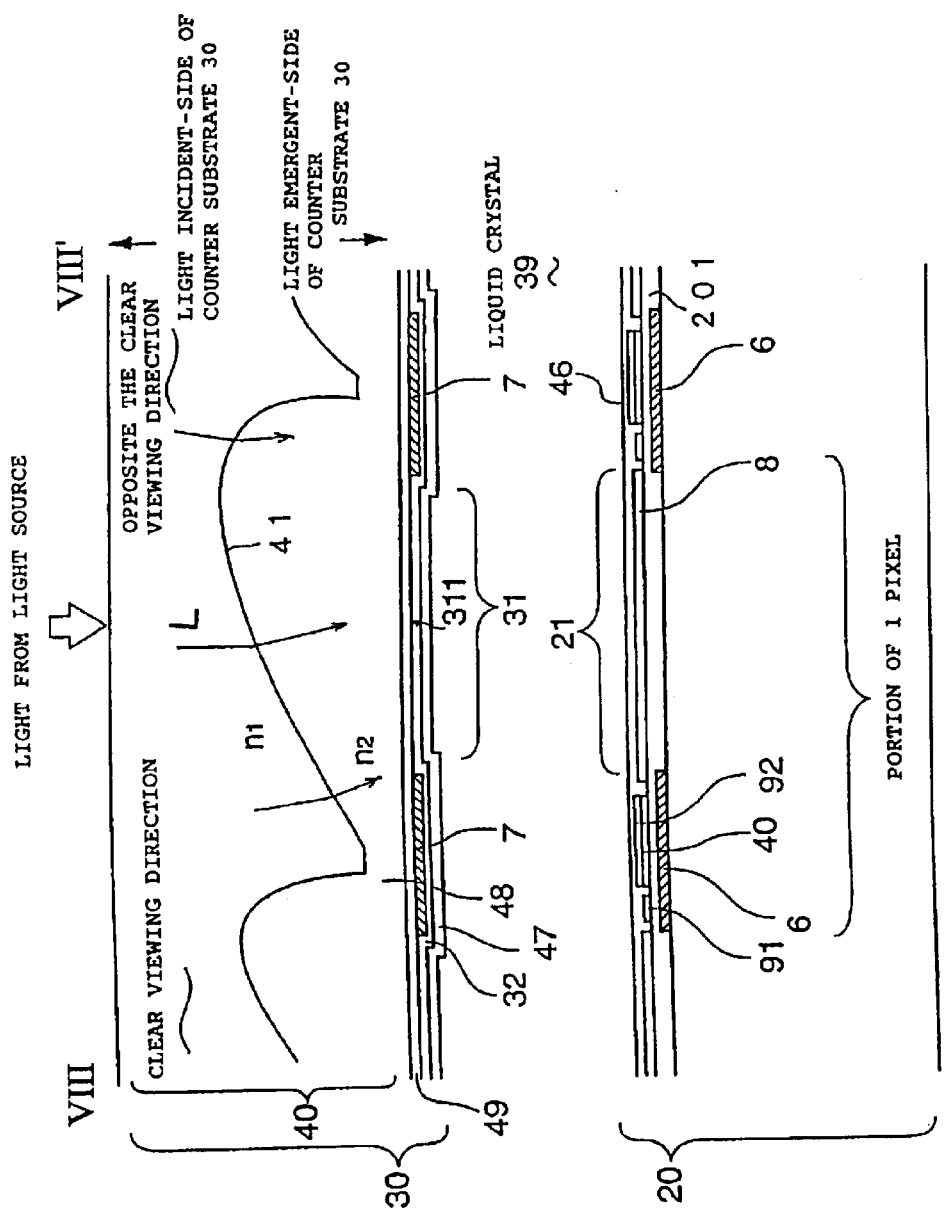
Figure 19:
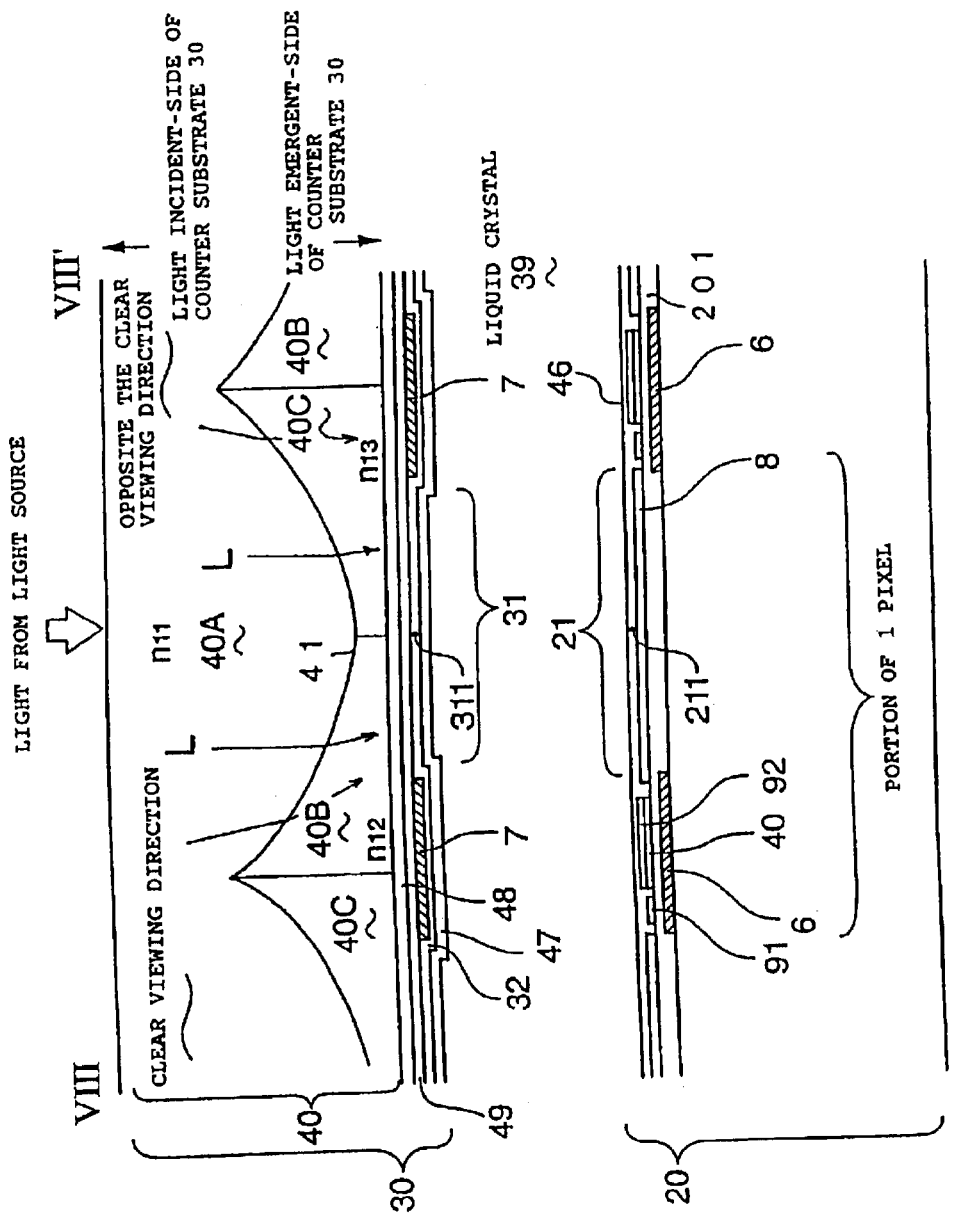

FIG. 18 is an enlarged sectional view showing an active matrix substrate, a counter substrate, and a bonding structure of these substrate in a liquid crystal device according to a modification of the fifth embodiment of the present invention FIG. 19 is an enlarged sectional view showing an active matrix substrate, a counter substrate, and a bonding structure of these substrates in a liquid crystal device according to a sixth embodiment of the present invention.

Figure 20:
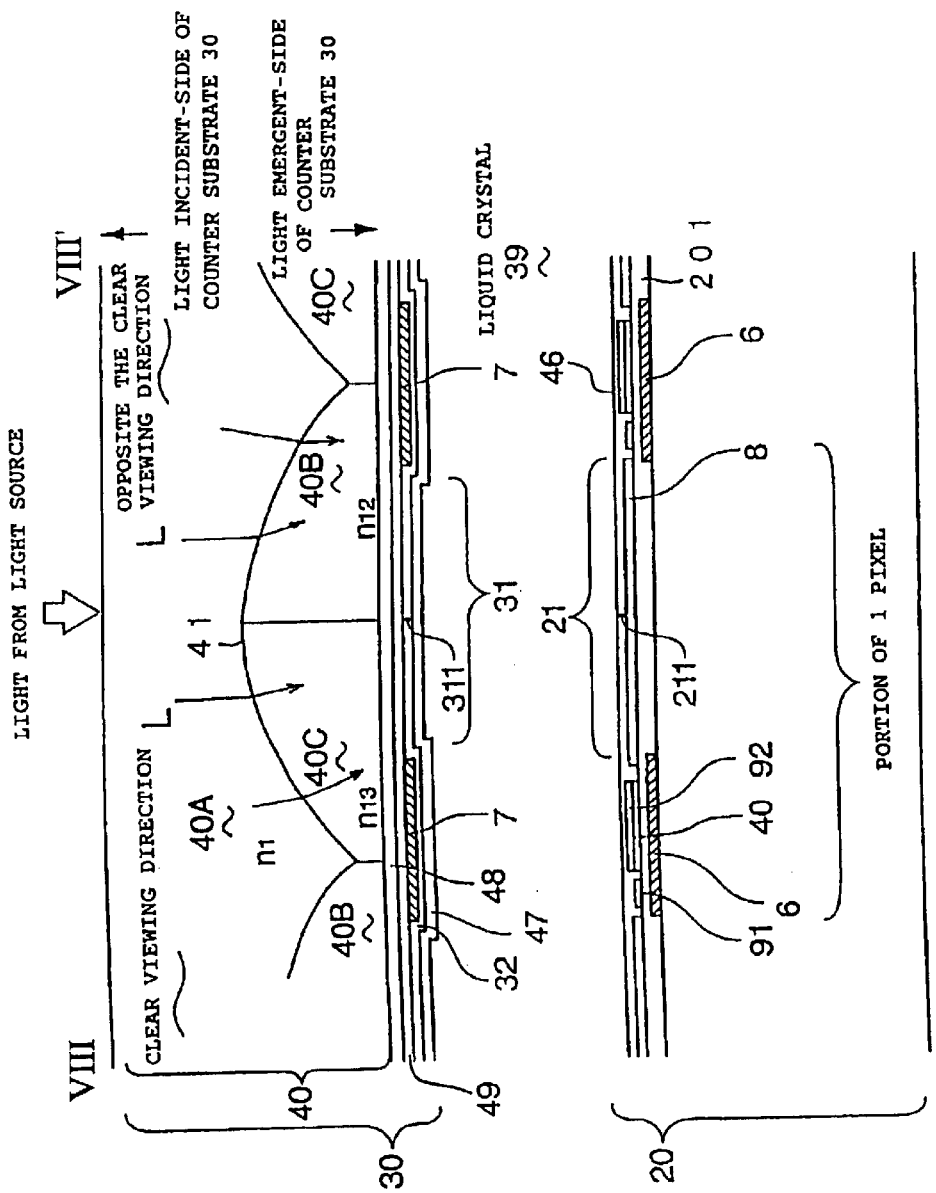

FIG. 20 is an enlarged sectional view showing an active matrix substrate, a counter substrate, and a bonding structure of these substrates in a liquid crystal device according to a seventh embodiment of the present invention.

Figure 21:
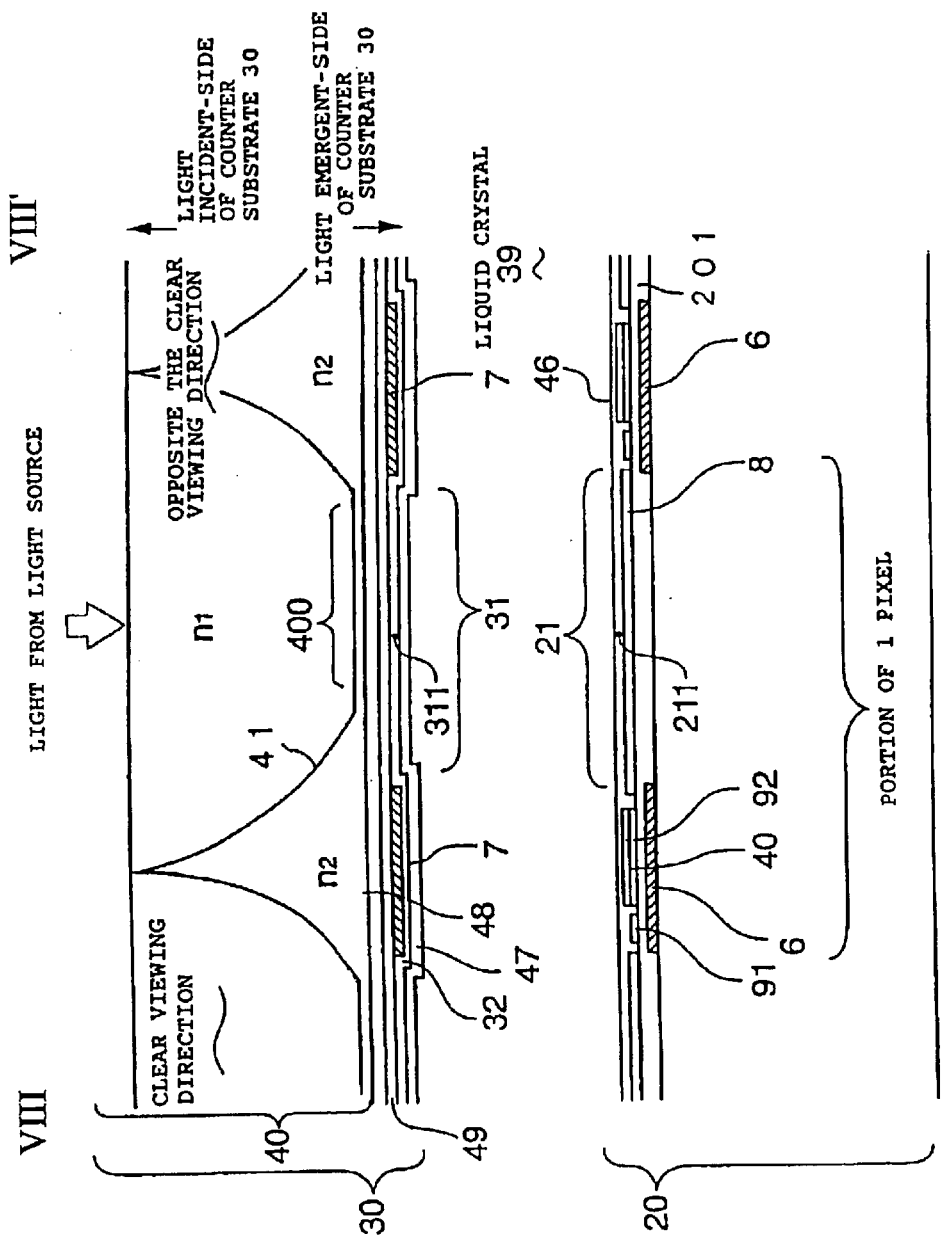

FIG. 21 is an enlarged sectional view showing an active matrix substrate, a counter substrate, and a bonding structure of these substrates in a liquid crystal device according to an eighth embodiment of the present invention.

Figure 22:
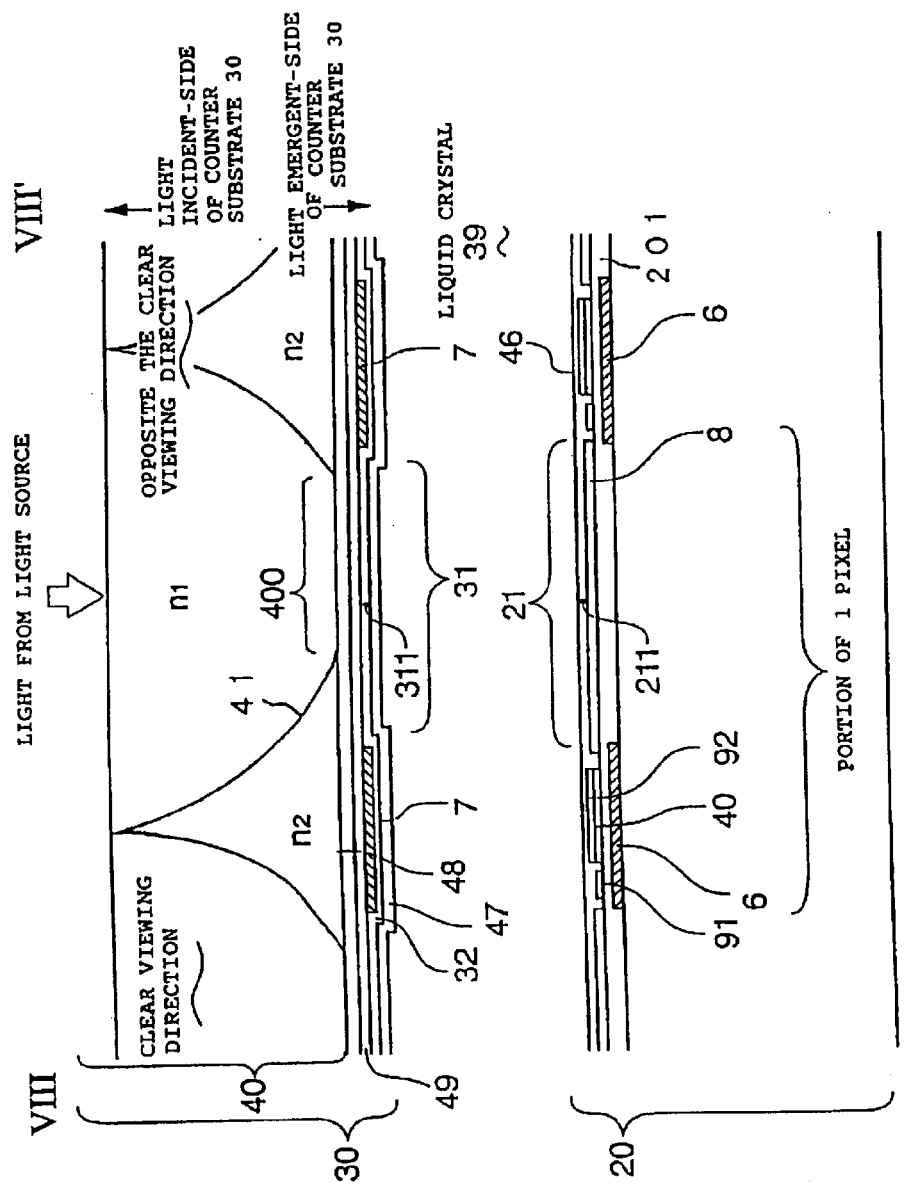

FIG. 22 is an enlarged sectional view showing an active matrix substrate, a counter substrate, and a bonding structure of these substrates in a liquid crystal device according to a first modification of the eighth embodiment of the present invention.

Figure 23:
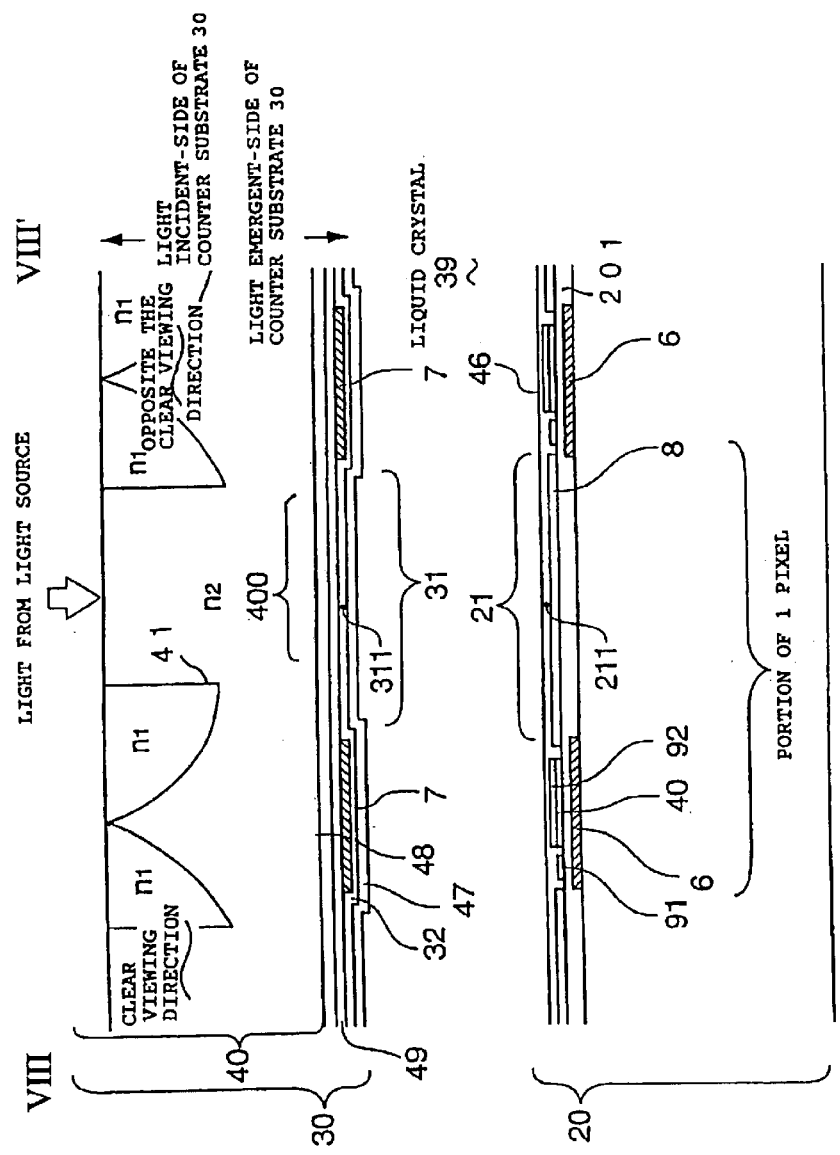

FIG. 23 is an enlarged sectional view showing an active matrix substrate, a counter substrate, and a bonding structure of these substrates in a liquid crystal device according to a second modification of the eighth embodiment of the present invention.

Figure 24:
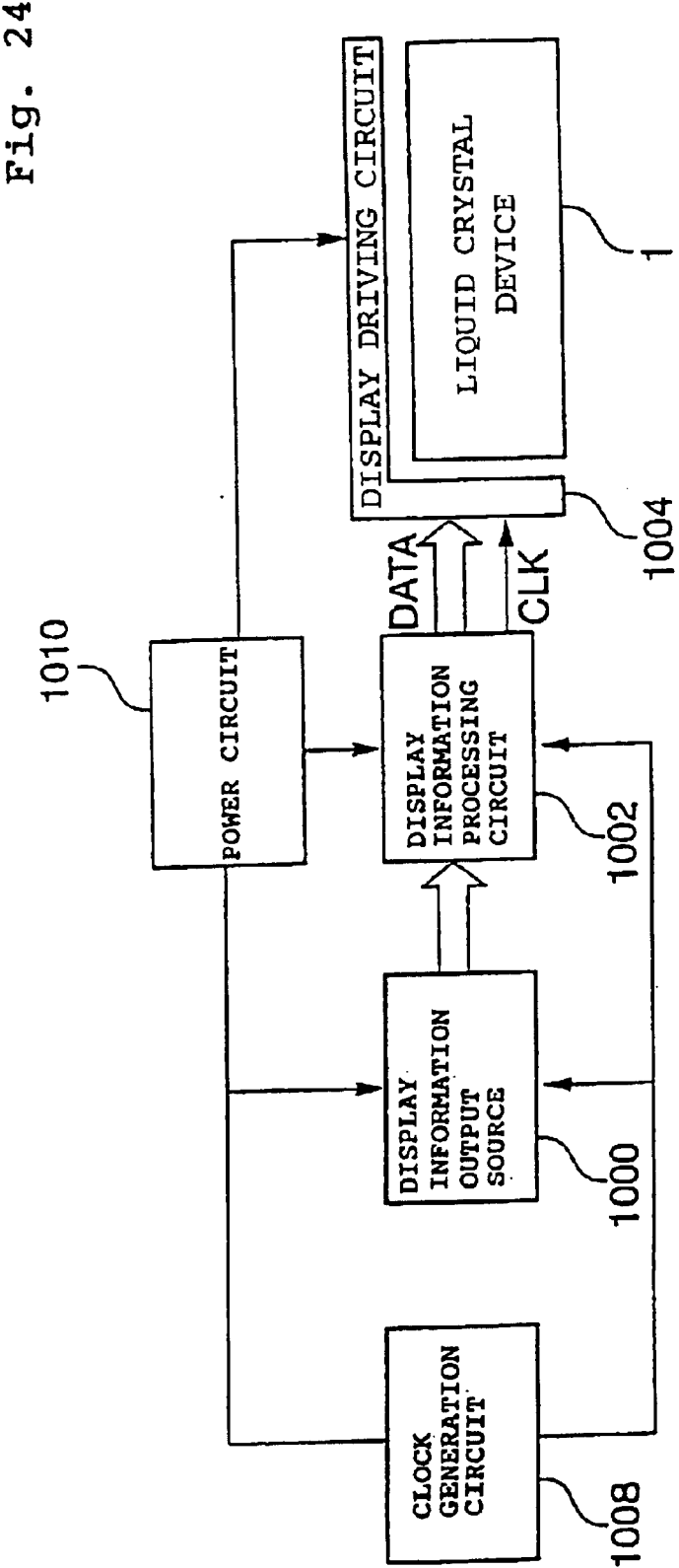

FIG. 24 is a block diagram showing a circuit configuration of a display device which shows a use example of a liquid crystal device to which the present invention is applied.

Figure 25:
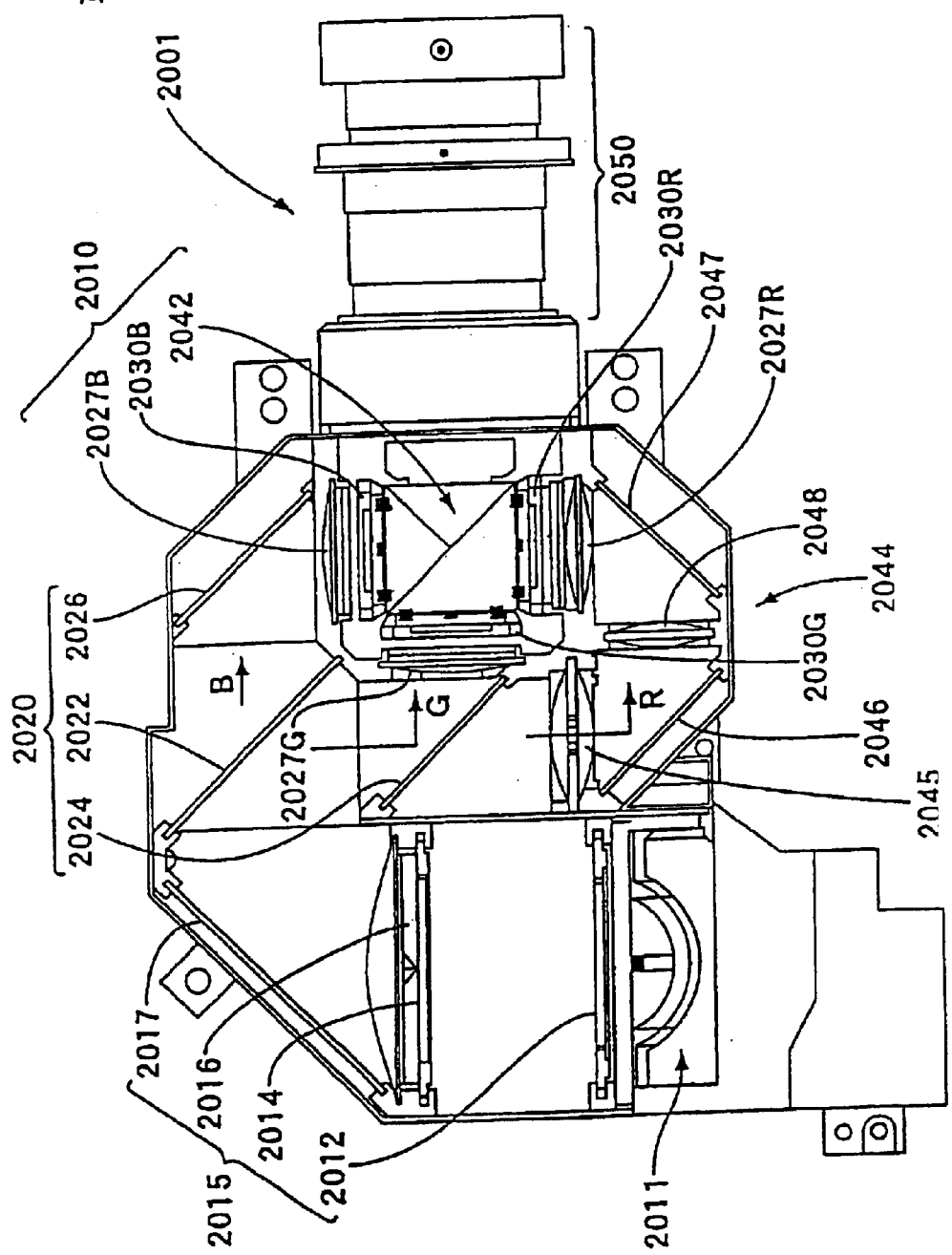

FIG. 25 is an overall structural view of a projection display device showing a use example of a liquid crystal device to which the present invention is applied.

Figure 26:
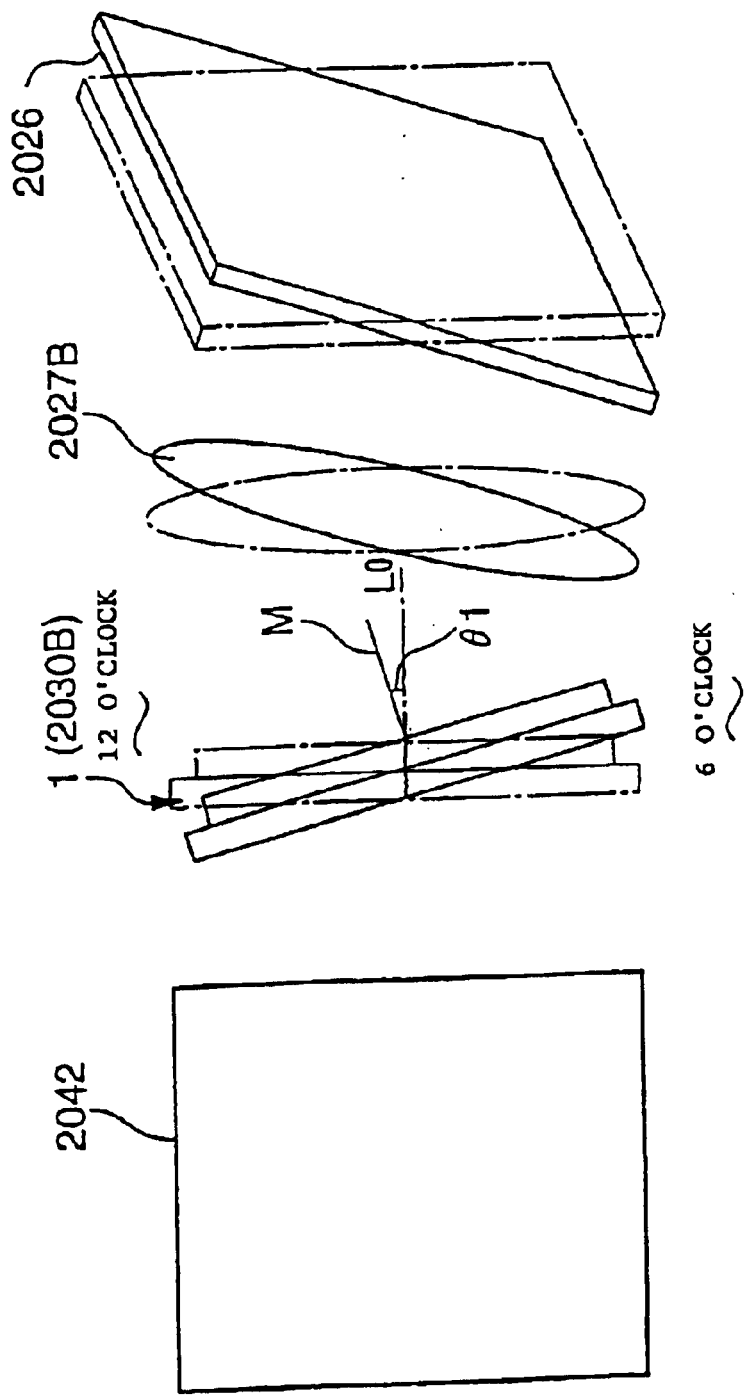

FIG. 26 is an explanatory view showing an example in which postures of a liquid crystal device, a condenser lens, and a reflecting mirror in the projection display device shown in FIG. 25 are modified.

Figure 27:
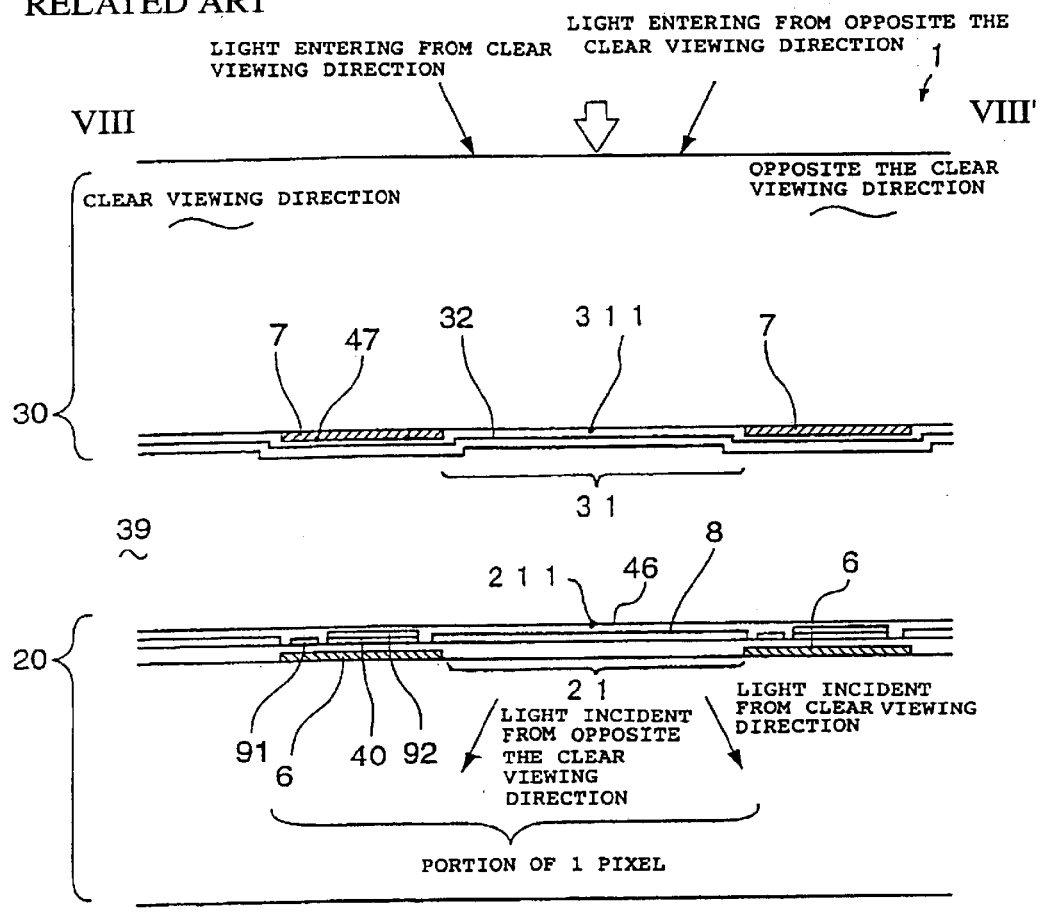

FIG. 27 is an enlarged sectional view showing an active matrix substrate, a counter substrate, and a bonding structure of these substrates used in a conventional liquid crystal device.

Figure 28:
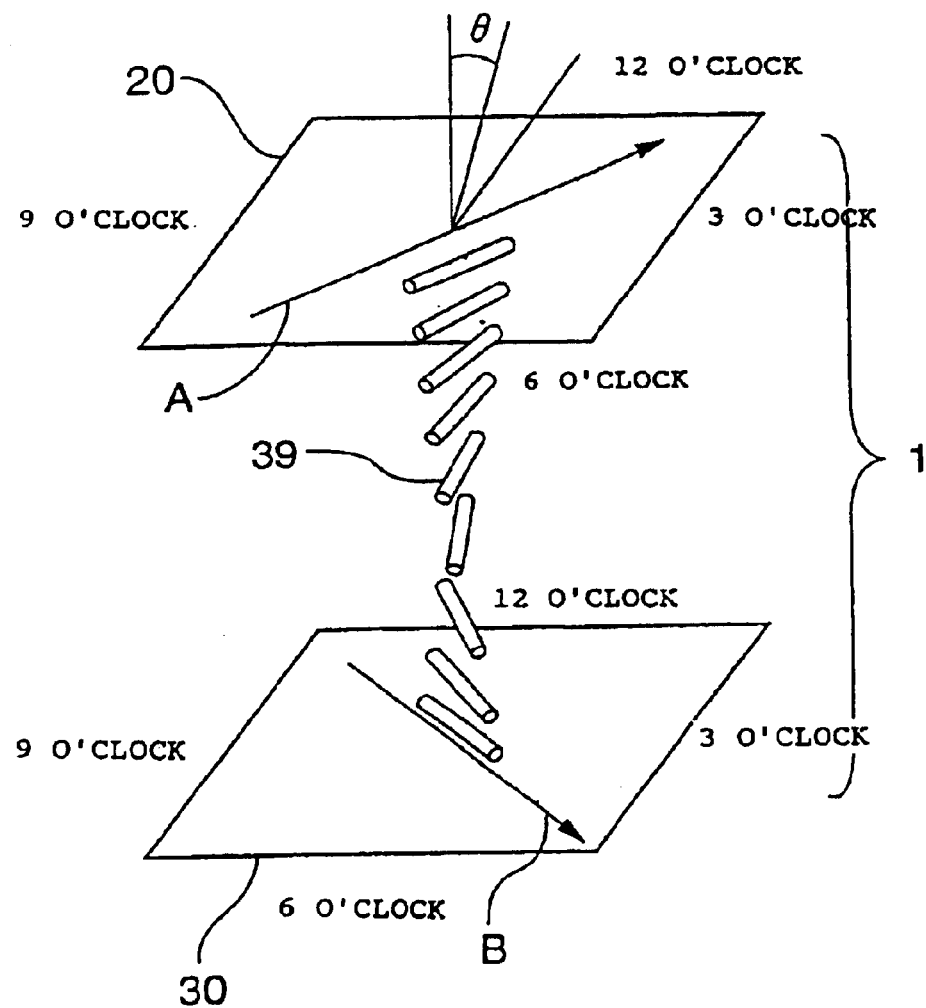

FIG. 28 is an explanatory view showing a state in which a major axis direction of liquid crystal is twisted 90° between substrates in a liquid crystal device.

FIGS. 29(A) and 29(B) are a graph showing contrast variation in a three o'clock-nine o'clock direction in a liquid crystal device, and a graph showing contact variation in a six o'clock-twelve o'clock direction in the liquid crystal device, respectively.

Figure 30:
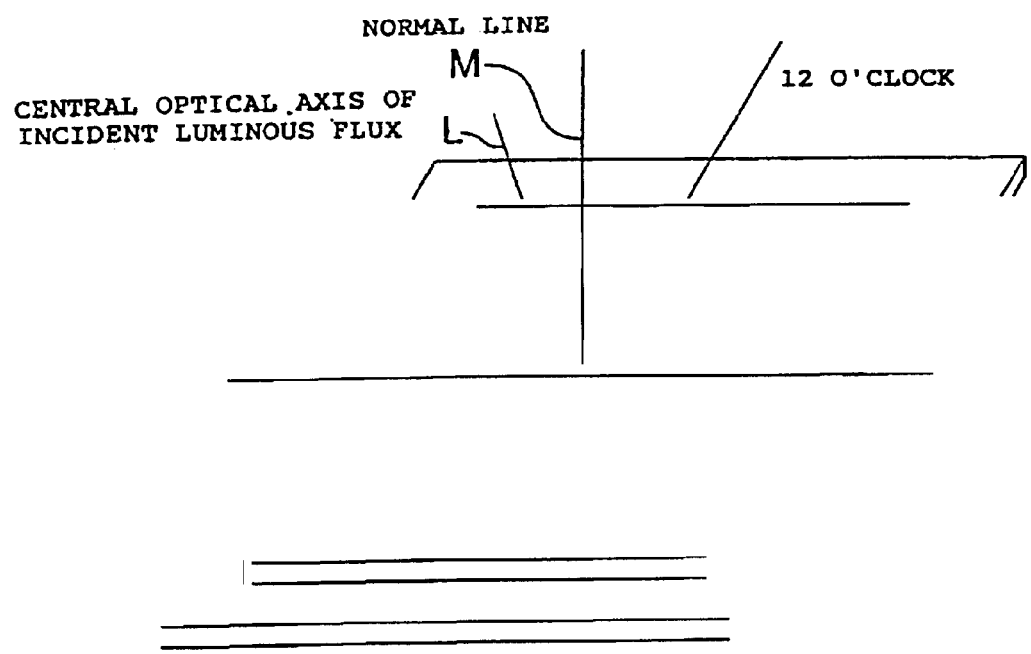

FIG. 30 is an explanatory view showing a state in which light enters a liquid crystal device from an oblique direction.

DETAILED DESCRIPTION OF THE EMBODIMENTS

Embodiments of the present invention will be described with reference to the drawings. Since the basic configurations of liquid crystal devices according to the embodiments described below are the same as the previously described conventional liquid crystal device, portions having common functions are indicated by the same reference numerals. In addition, while the embodiments will be described below, the configuration of the embodiments will be described first.

Overall Configuration of Liquid Crystal Device

Figure 1:
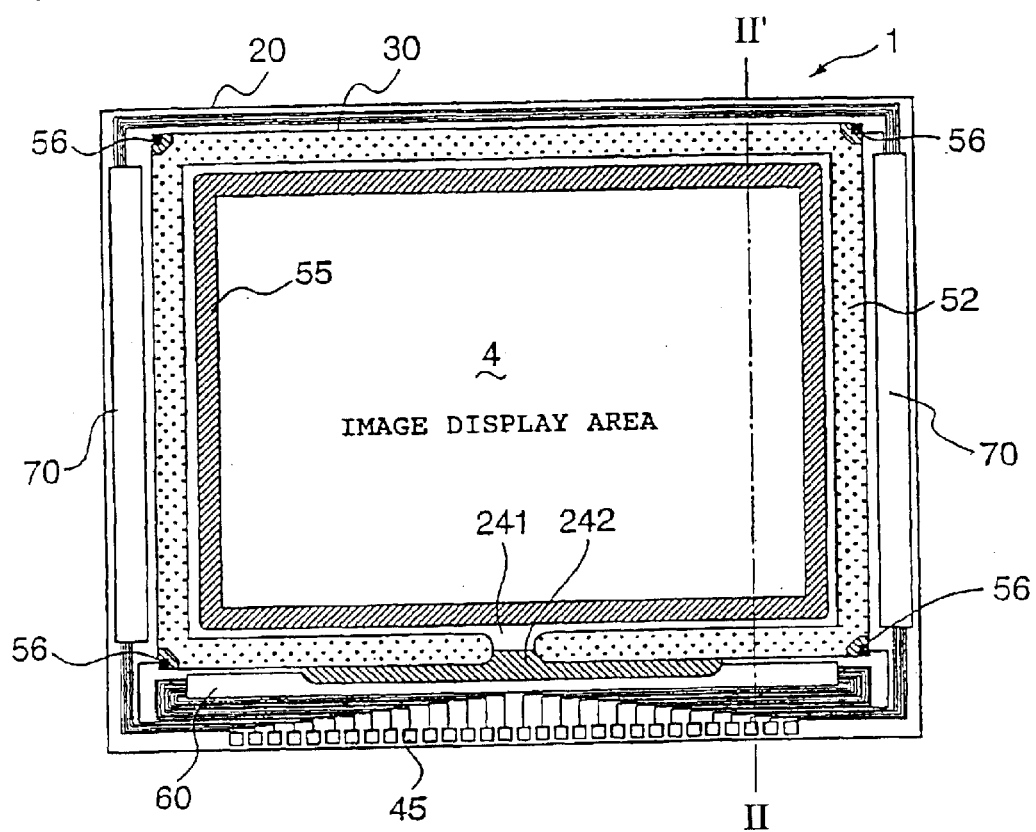
FIG. 1 is a plan view of a liquid crystal device to which the present invention is applied, as viewed from the side of a counter substrate.
Figure 2:
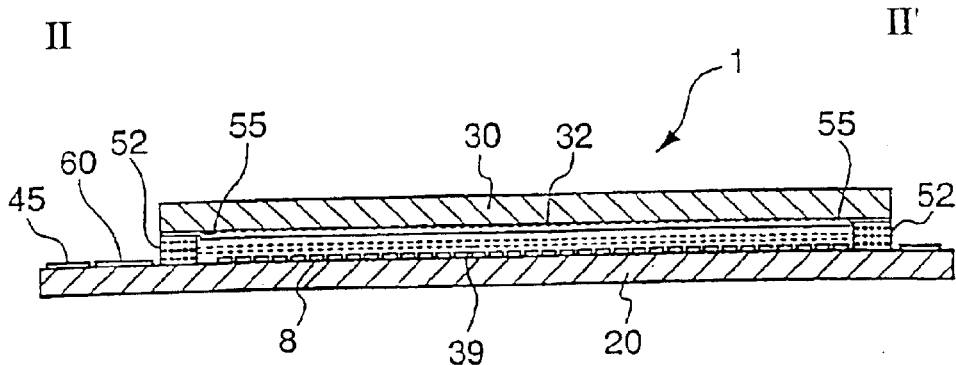
FIG. 2 is a sectional view of the liquid crystal device taken along the line II—II in FIG. 1.

FIGS. 1 and 2 are a plan view of a liquid crystal device 1 according to this embodiment as viewed from the side of a counter substrate, and a sectional view of the liquid crystal device 1 taken along the line II—II in FIG. 1, respectively.

As shown in FIGS. 1 and 2, the liquid crystal device 1 is generally composed of an active matrix substrate 20 formed with pixel electrodes 8 in a matrix, a counter substrate 30 formed with a counter electrode 32, and liquid crystal 39 sealed and sandwiched between the active matrix substrate 20 and the counter substrate 30. The active matrix substrate 20 and the counter substrate 30 are bonded by a sealing member, which contains a gap member and is formed along an outer periphery of the counter substrate 30, via a predetermined gap. In addition, a liquid crystal sealing area is partitioned and formed between the active matrix substrate 20 and the counter substrate 30 by the sealing member 52 containing the gap member, and the liquid crystal is sealed therein. As the sealing member 52, epoxy resin or various types of ultraviolet curable resin can be used. In addition, as the gap member, an inorganic or organic fiber, or a spheres of about 2 $\mu$m to 10 $\mu$m can be used.

The counter substrate 30 is smaller than the active matrix substrate 20, and the peripheral portion of the active matrix substrate 20 is bonded in a state protruding from the outer periphery of the counter substrate 30. Accordingly, driving circuits (a scanning line-driving circuit 70 and a data line-driving circuit 60) and an input-output terminal 45 of the active matrix substrate 20 are exposed from the counter substrate 30. The sealing member 52 is partially broken to form a liquid crystal inlet 241. After bonding the counter substrate 30 and the active matrix substrate 20, the liquid crystal 39 is sealed from the liquid crystal inlet 241 and then, the liquid crystal inlet 241 is sealed with a sealant 242. The counter substrate 30 is also formed with a display partitioning light-shielding film 55 for partitioning an image display area 4 inside the sealing member 52. In addition, at each corner of the counter substrates 30, there are upper and lower conducting members 56 for achieving electrical continuity between the active matrix substrate 20 and the counter substrate 30.

Configuration of Active Matrix Substrate

Figure 3:
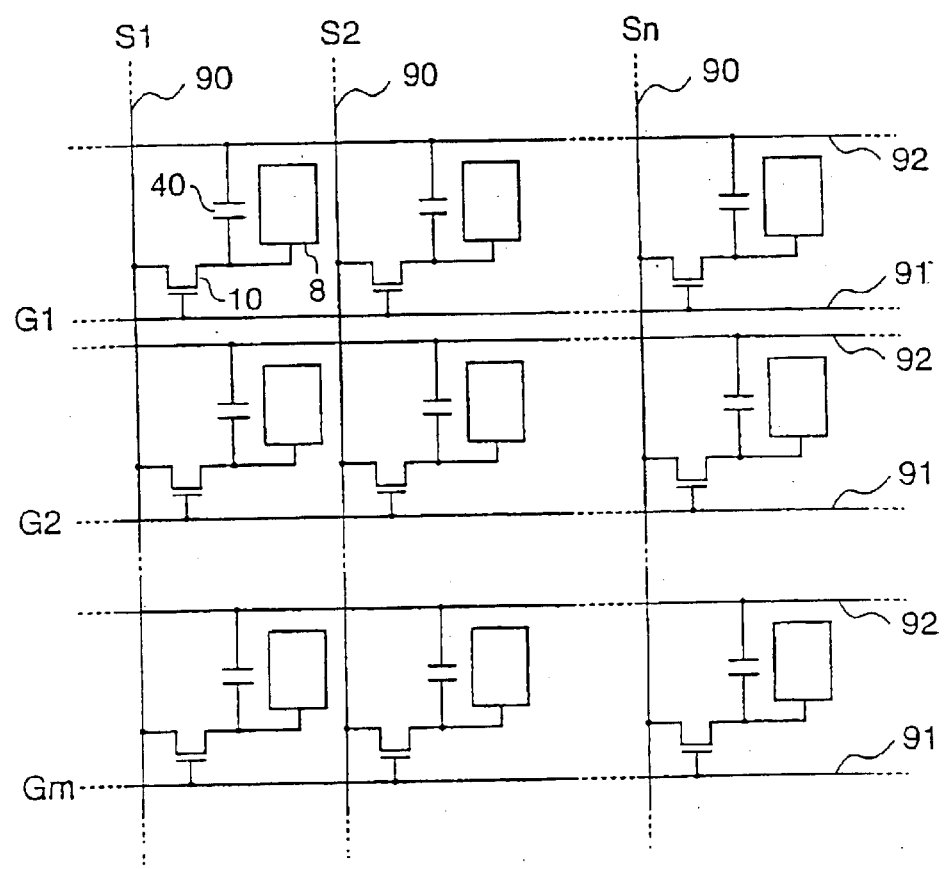
FIG. 3 is a block diagram schematically showing the configuration of the liquid crystal device shown in FIG. 1.
Figure 4:
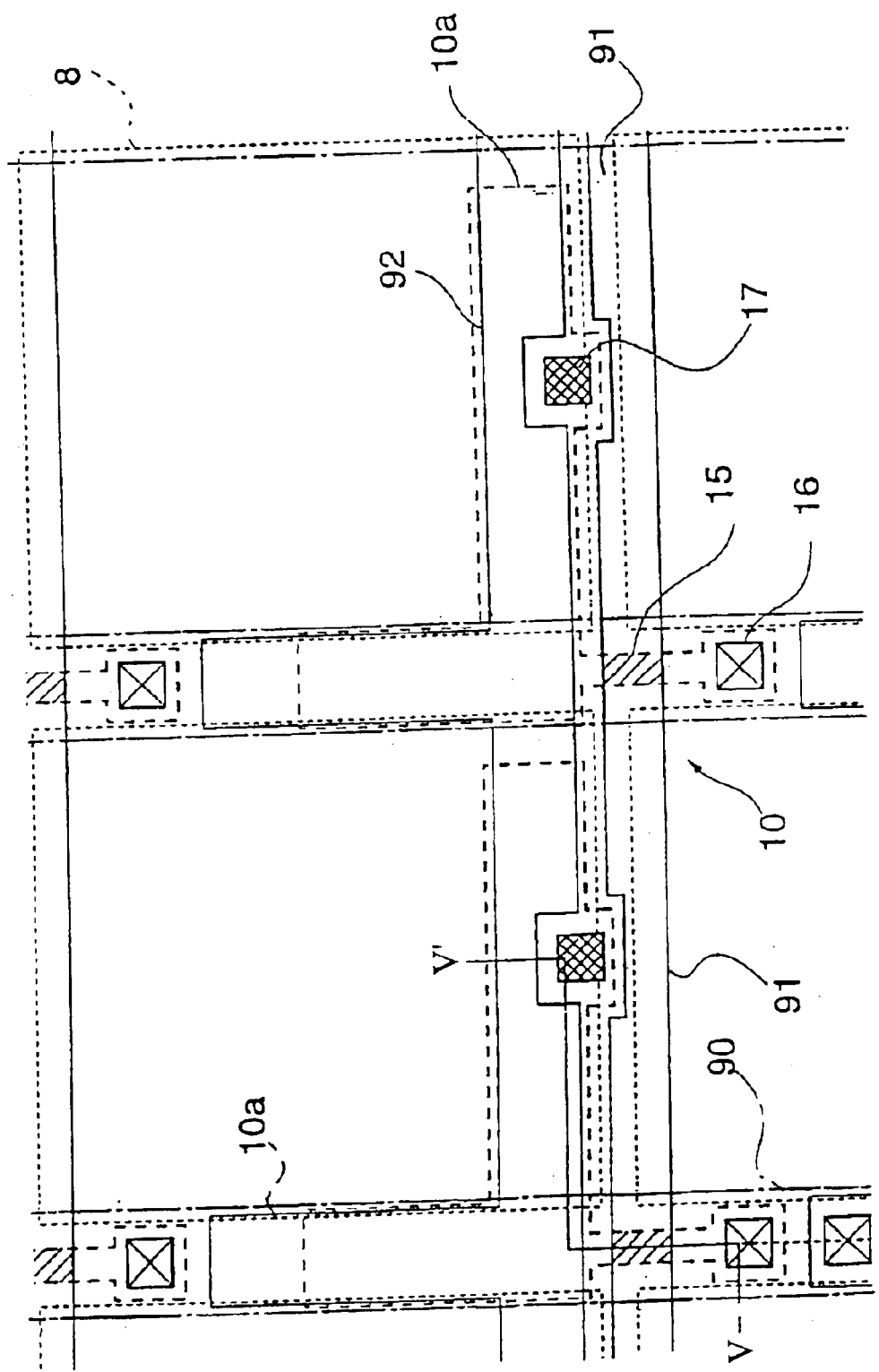
FIG. 4 is an extracted plan view showing a part of pixel areas of the liquid crystal device shown in FIG. 1.
Figure 5:
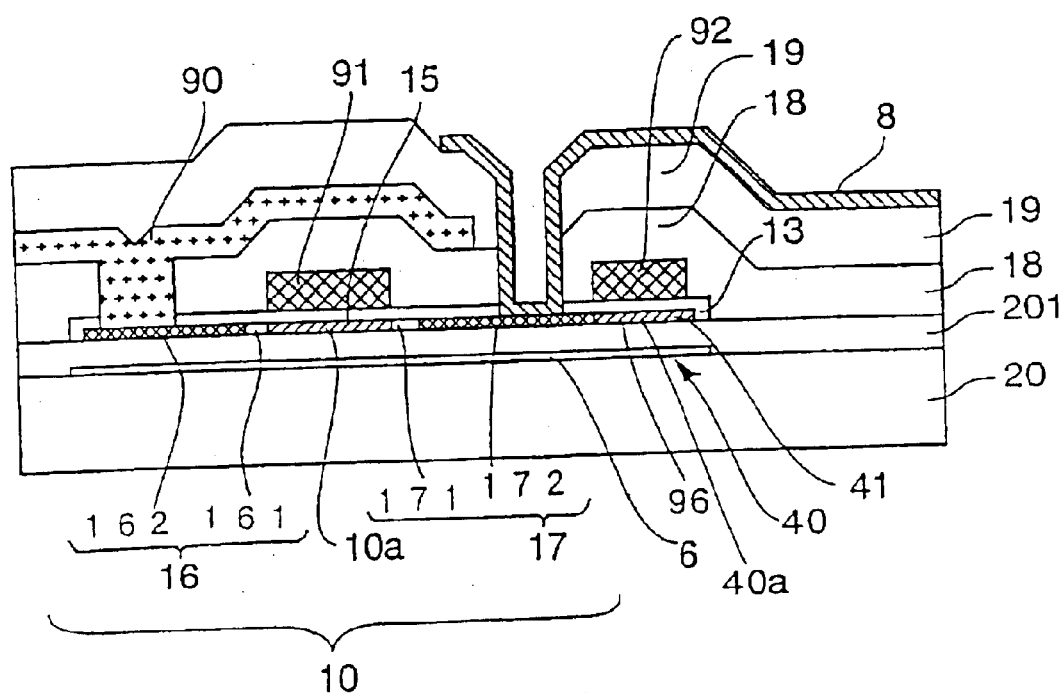
FIG. 5 is a sectional view of an active matrix substrate taken along the line V—V in FIG. 4.

FIG. 3 is a block diagram schematically showing a configuration of a liquid crystal device 1, FIG. 4 is an extracted plan view showing a part of a pixel area of the active matrix substrate (light-shielding layers are omitted) used in the liquid crystal device (light-shielding layers are omitted), and FIG. 5 is a sectional view of the active matrix substrate taken along the line V—V of FIG. 4.

In FIG. 3, each of a plurality of pixels formed in a matrix for constituting the image display area 4 of the liquid crystal device 1 consists of a TFT 10 serving as a pixel switching element for controlling a pixel electrode 8, and a data line 90 to which image signals are supplied is electrically connected to a source of the TFT 10. The image signals S1, S2, . . . Sn to be written are sequentially supplied to the data lines 90. In addition, scanning signals G1, G2, . . . Gm are line-sequentially applied in a series of pulses to a gate electrode, in that order, via a scanning line 91 of the TFT 10. The pixel electrode 8 is electrically connected to a drain of the TFT 10, and by closing a switch of the TFT 10 for a fixed period of time, the image signals S1, S2, . . . Sn supplied from the data line 90 are written at predetermined timings. The image signals S1, S2, . . . Sn at a predetermined level written in the liquid crystal via the pixel electrode 8 are held between the pixel electrode 8 and a counter electrode 32 (see FIG. 1, etc.) formed on a counter substrate 30 (see FIG. 1, etc.) for a fixed period of time. To prevent leakage of the held image signals, a storage capacitor 40 is additionally formed in parallel with a liquid crystal capacitance formed between the pixel electrode 8 and the counter electrode. As a method for forming the storage capacitor 40 in this way, a capacitor line 92 that is a wiring for forming capacitance may be provided, or capacitance may be formed between the pixel electrode 8 and the scanning line 91.

As shown in FIG. 4, in each pixel, a plurality of transparent pixel electrodes 8 are formed in a matrix, and the data line 90, the scanning line 91, and the capacitor line 92 are formed along the vertical and horizontal boundaries of the pixel electro 8. The data line 90 is electrically connected to a source area 16 in semiconductor layers, such as polysilicon films, via a contact hole. The pixel electrode 8 is electrically connected to a drain area 17 via a contact hole. The scanning line 91 extends so as to oppose a channel area 15. The storage capacitor 40 has a structure such that a silicon film 40a (semiconductor film/shadowed area in FIG. 5) corresponding to an extended portion of a silicon film 10a (semiconductor film/shadowed area in FIG. 5 for forming the pixel-switching TFT 10 is rendered conductive to be used as a lower electrode 41, and the capacitor line 92 is superimposed as an upper electrode on the lower electrode 41.

A cross section of the thus-configured pixel area taken along the lined V—V is basically represented as shown in FIG. 5. First, island silicon films 10a and 40a on a base insulating layer 201 are formed on the surface of the active matrix substrate 2. In addition, a gate insulating film 13 is formed on the surface of the silicon film 10a, and the scanning line 91 (gate electrode) is formed on the gate insulating film 13. In the silicon film 10a, an area opposing the scanning line 91 via the gate insulating film 13 is a channel area 15. A source area 16 including a low-concentration source area 161 and a high-concentration source area 162 is formed on one side of the channel area 15, and a drain area 17 including a low-concentration drain area 171 and a high-concentration drain area 172 is formed on the other side. A first interlayer insulating film 18 and a second interlayer insulating film 19 are formed on the surface of the thus-configured pixel switching TFT 10, and the data line 90 formed on the surface of the first interlayer insulating film 18 is electrically connected to the high-concentration source area 162 via a contact hole formed in the first interlayer insulating film 18. In addition, the pixel electrode 8 is electrically connected to the high-concentration drain area 7 via contact holes formed in the first interlayer insulating film 18 and the second interlayer insulating film 19. In addition, the silicon film 40a extending from the high-concentration drain area 172 is formed with a lower electrode 41 consisting of a low-concentration area, and the capacitor line 92 opposes the lower electrode 41 via an insulting film (dielectric film) that is formed upon formation of the gate insulating film 13. The storage capacitor 40 is formed in this way.

While the TFT 10 preferably has an LDD structure as described above, it may have an offset structure, or it may be a self-alignment TFT in which doping ions are implanted at a high concentration using the scanning line 91 as a mask so as to form high-concentration source and drain in a self-aligned manner.

First Embodiment

Figure 6:
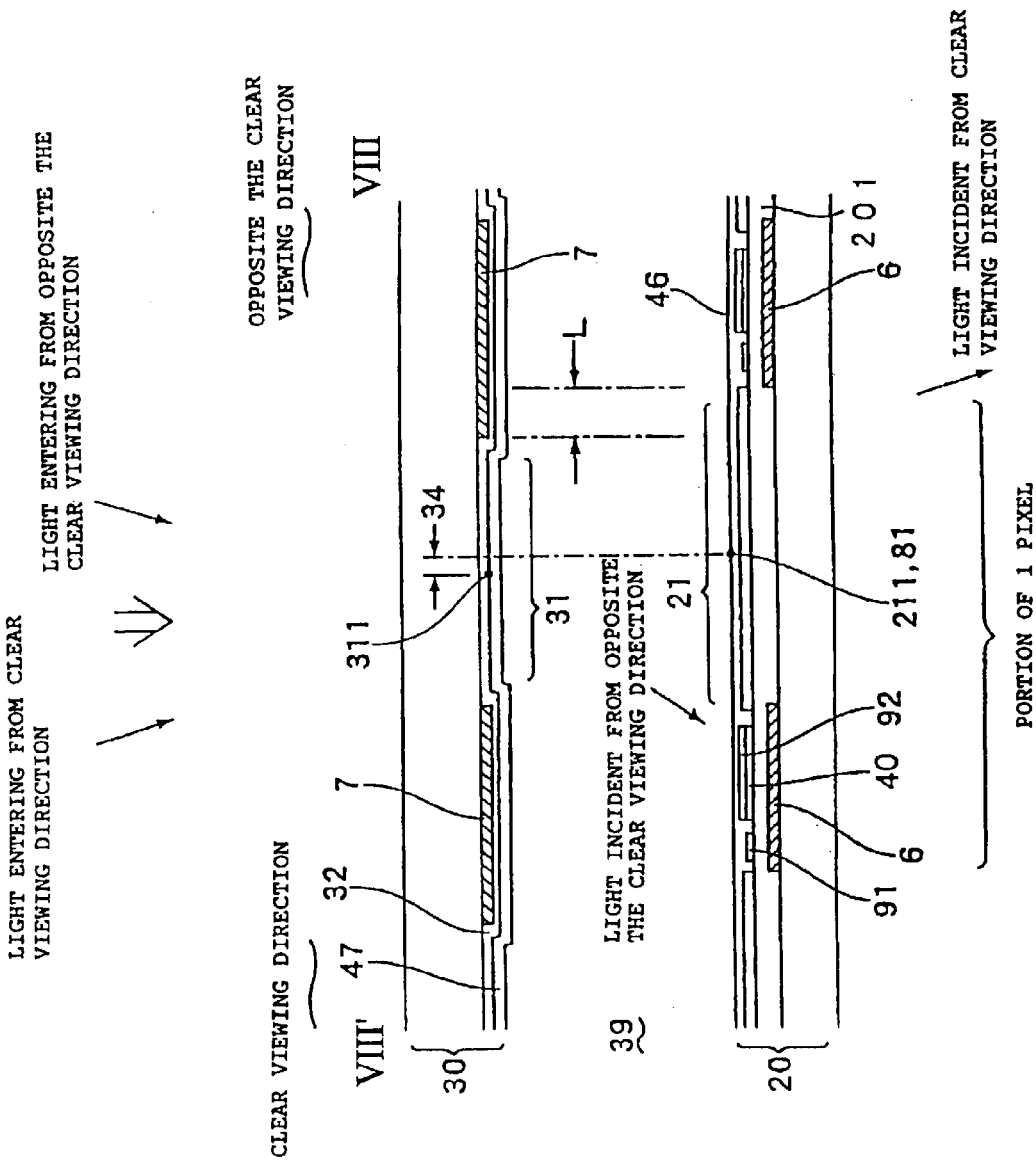
FIG. 6 is an enlarged sectional view showing an active matrix substrate, a counter substrate, and a bonding structure of these substrates in a liquid crystal device according to the first embodiment of the present invention.
Figure 7:
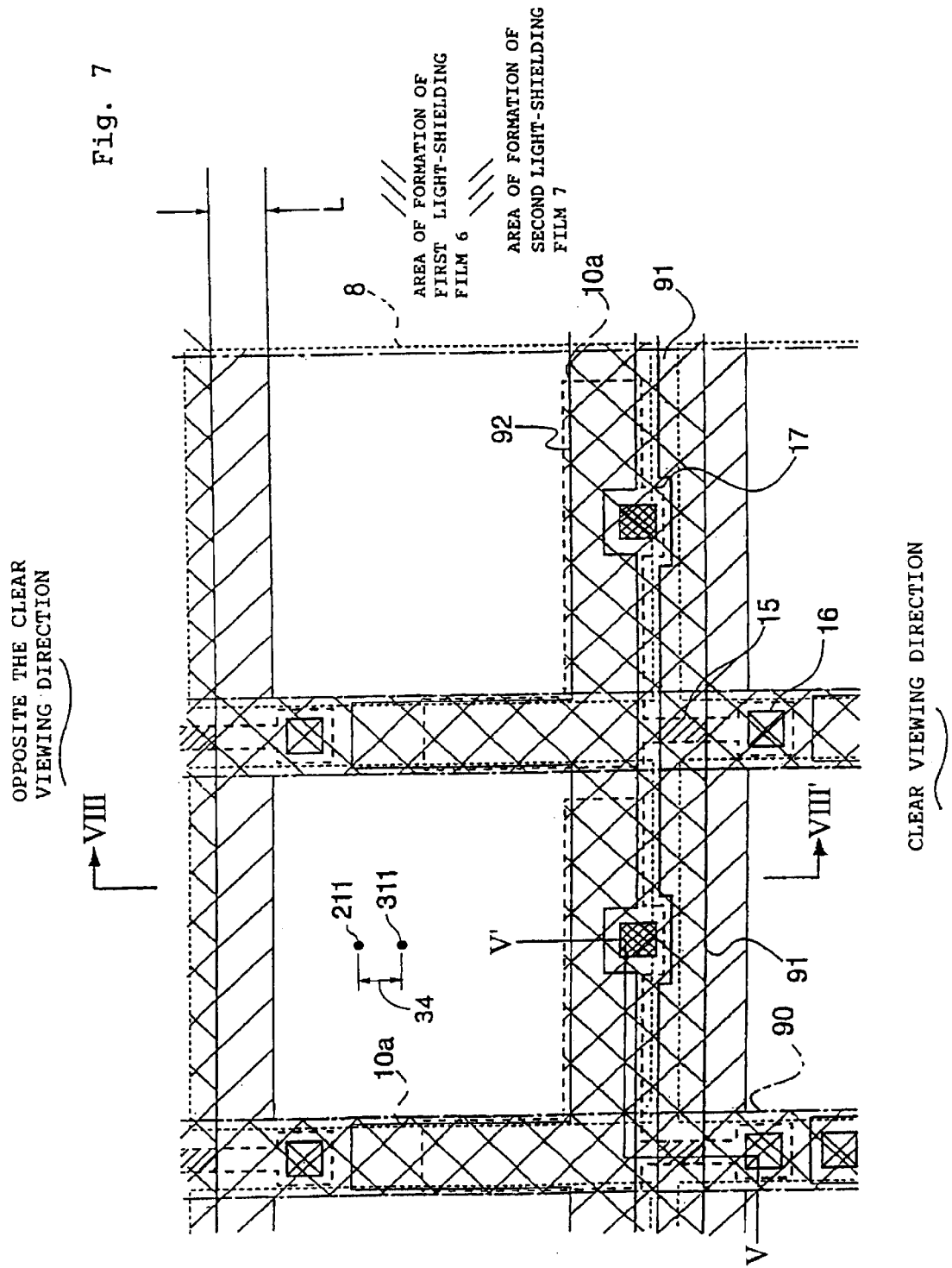
FIG. 7 is a plan view showing the positional relationship between first and second light-shielding films formed on an active matrix substrate and a counter substrate of the liquid crystal device shown in FIG. 6.
Figure 8:
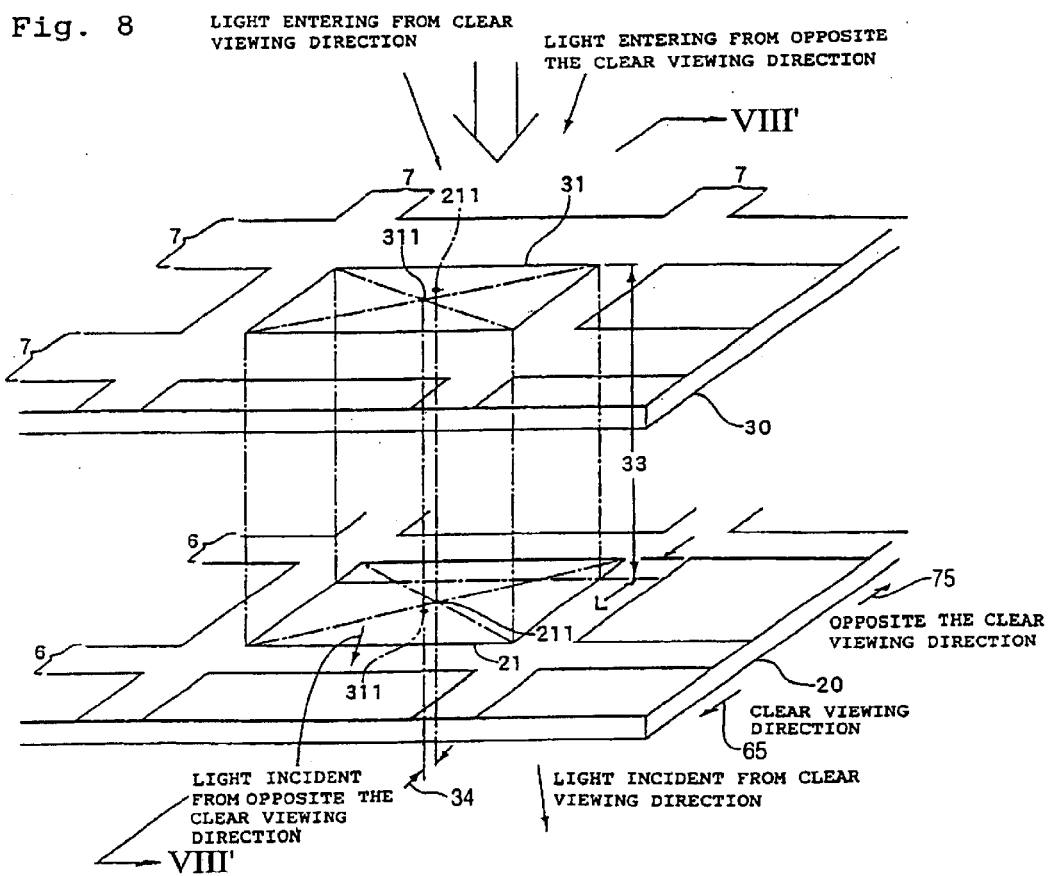
FIG. 8 is an explanatory view showing the positional relationship between the first and second light-shielding films formed on the active matrix substrate and the counter substrate of the liquid crystal device shown in FIG. 6.

FIG. 6 is an enlarged view showing an active matrix substrate, a counter substrate, and a bonding structure of these substrates used in a liquid crystal device 1 according to the first embodiment of the present invention. FIGS. 7 and 8 are a plan view and an explanatory view, respectively, showing the positional relationship between a first light-shielding film 6 formed on an active matrix substrate 20 of the liquid crystal device 1 and a second light-shielding film 7 formed on a counter electrode 30. A cross section shown in FIG. 6 corresponds to a cross section taken along the line VIII—VIII in FIG. 7 and FIG. 8.

As shown in FIG. 6, in the liquid crystal device 1 of this embodiment, on the side of the active matrix substrate 20, a first light-shielding film 6 consisting of a metallic film, such as of chrome, is formed on the lower layer of a base protective film 201, and the first light-shielding film 6 is, as shown by an area of lines sloping down to the left in FIG. 7, formed in a matrix between adjacent pixel electrodes 8. For this reason, the first light-shielding film 6 is formed in an area which two-dimensionally overlaps the data line 90, the scanning line 91, the capacitor line 92, the TFT 10, and the storage capacitor 40 described with reference to FIG. 5, and a first opening area 21 is partitioned and formed in each pixel of the active matrix substrate 20 by the first light-shielding film 6.

In addition, on the side of the counter substrate 30, a second light-shielding film 7 consisting of a metallic film, such as chrome, is formed in a matrix so as to oppose the first light-shielding film 6 of the active matrix substrate 20, and a second opening area 31 is formed by the second light-shielding film 7. The area of formation of the second light-shielding film 7 is shown as an area of lines sloping down to the right in FIG. 7. Furthermore, a counter electrode 32 and an alignment layer 47 are formed on the side of the counter substrate 30.

After rubbing treatment is applied on the thus-configured counter substrate 30 and the active matrix substrate 20 in directions perpendicular to each other, the substrates 30 and 20 are bonded via a predetermined gap 33 normal to the planar surfaces of the substrates, and thereafter, liquid crystal 39 is sealed in the gap. As a result, the liquid crystal 39 is twist-aligned 90° between the active matrix substrate 20 and the counter substrate 30. Accordingly, a clear viewing direction 65 and a direction opposite 75 to the clear viewing direction are produced in the liquid crystal device 1 in response to the alignment state of the liquid crystal 39, and if light incident on the liquid crystal device 1 from the direction inclined opposite to the clear viewing direction affects the display, contrast is degraded. In the example shown herein, in each pixel, the side on which the pixel switching TFT 10 is located with respect to the pixel electrode 8 (the lower side in the figure) is a clear viewing direction, and the side opposite thereto (the upper side in the figure) is opposite to the clear viewing direction.

In this embodiment, as shown in FIGS. 7 and 8, of the first and second light-shielding films 6 and 7, the second light-shielding film 7 formed on the side of the counter substrate 30 (one substrate) into which light enters is formed in such a manner that it broadly overlaps the first opening area 21 formed on the side of the active matrix substrate 20 (other substrate) from which light is emitted, at the side of opposite the clear viewing direction compared to the side of the clear viewing direction. For this reason, a center position 311 of the second opening area 31 formed on the side of the counter substrate 30 is offset by an offset distance 34 toward the clear viewing direction 65 with respect to a center position 211 of the first opening area 21 formed on the side of the active matrix substrate 20. That is, in each pixel, since an edge of the second light-shielding film 7 nearly overlaps an edge of the first light-shielding film 6 on the side where the pixel switching TFT 10 is formed (the side of the clear viewing direction), the second light-shielding film 7 hardly overlaps the first opening area 21 on the side of the clear viewing direction. On the side opposite to the side where the pixel switching TFT 10 is formed (the side opposite to the clear viewing direction), however, the edge of the second light-shielding film 7 protrudes from the edge of the first light-shielding film 6 toward the first opening area 21 by an amount corresponding to the width L. In addition, a capacitor line and a scanning line are also formed on the side of the clear viewing direction.

For this reason, in the liquid crystal device 1 of this embodiment, as shown in FIGS. 6 and 8, of the light incident from the side of the counter substrate 30, light incident from the direction inclined toward the clear viewing direction is emitted from the first opening area 21 of the active matrix substrate 20 and affects the display; however, light incident on the counter substrate 30 from the direction inclined toward the opposite of the clear viewing direction is illuminated at a position offset from the first opening area 21 with respect to the active matrix substrate 20, whereby the light can be prevented from being emitted from the active matrix substrate 20 which is shielded by the first light-shielding film 6 located in the clear viewing direction in each pixel. Therefore, even if the light incident from the side of the counter substrate 30 contains lights inclined in the clear viewing direction and opposite to the clear viewing direction, since the light inclined opposite to the clear viewing direction that causes the degradation of contrast can be prevented from being emitted from the active matrix substrate 20, the light does not affect the display. Therefore, according to the liquid crystal device 1 to which the present invention is applied, display with high contrast can be effected.

In addition, according to the liquid crystal device 1 of this embodiment, in each pixel, since the pixel switching TFT 10 is formed on the side of the clear viewing direction with respect to the pixel electrode 8, light incident from the direction inclined toward the opposite of the clear viewing direction can be effectively intercepted. That is, in the active matrix substrate 20, since the first opening area 21 is basically formed by removing the areas of formation of the pixel switching TFT 10 and the storage capacitor 40 from the area rectangularly partitioned by the data line 90, the scanning line 91, and the capacitor line 92, the first light-shielding film 6 protrudes on the side of the formation of the pixel switching TFT 10 by the amount thereof. For this reason, since an area through which light does not pass is wide on the side of the formation of the pixel switching TFT 10 by the amount thereof, light incident from the direction inclined toward the opposite of the clear viewing direction can be intercepted by utilizing the area on which the pixel switching TFT 10 is formed.

In this embodiment, as is the case in the third to eighth embodiments described below, the counter substrate 30 may be formed with a microlens. In this case, if an optical center position of the microlens is brought into coincidence with the center position 211 of the opening area 21 of the counter substrate 30, light utilization efficiency can be improved, thereby enabling display with good contrast. Conversely, if the optical center position of the microlens is offset from the center position 211 of the opening area toward the clear viewing direction, preferably, so as to be nearly coincident with the center position 311 of the opening area 31, display with good contrast can be effected, and light incident from the opposite of the clear viewing direction can be effectively prevented.

In offsetting the center position 311 of the second opening area 31 formed on the side of the counter substrate 30 toward the clear viewing direction with respect to the center position 211 of the first opening area 21 formed on the side of the active matrix substrate 20, in addition to a configuration of the first embodiment in which the second light-shielding film 7 formed on the side of the counter substrate 30 broadly overlaps the first opening area 21 formed on the side of the active matrix substrate 20 at the side of the opposite of the clear viewing direction compared to the side of the clear viewing direction, a configuration in which the first light-shielding film 6 formed on the side of the active matrix substrate 20 broadly overlaps the second opening area 31 formed on the side of the counter substrate 30 at the side of the clear viewing direction compared to the side of the opposite of the clear viewing direction, or a combination of these configurations as in a second embodiment, described below, may be employed.

Second Embodiment

Figure 9:
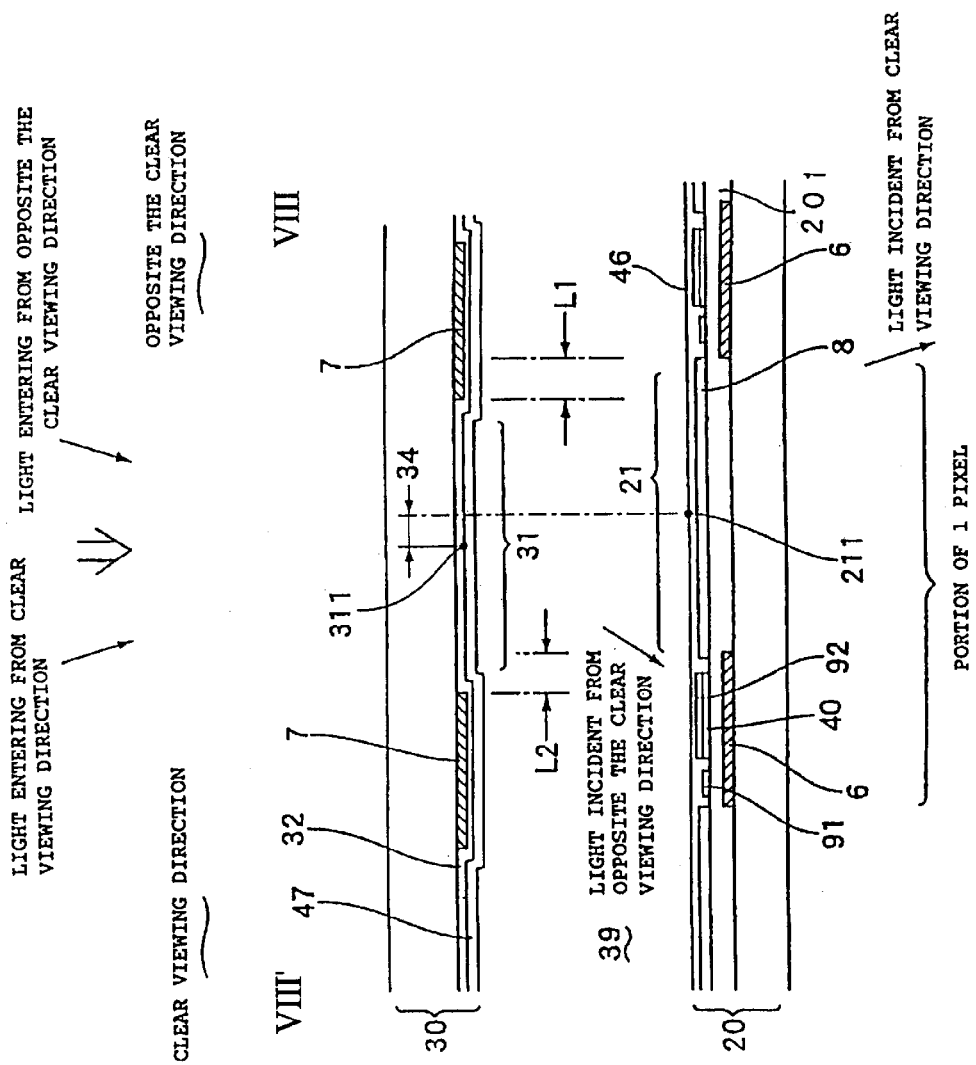
FIG. 9 is an enlarged sectional view showing an active matrix substrate, a counter substrate, and a bonding structure of these substrates in a liquid crystal device according to a second embodiment of the present invention.
Figure 10:
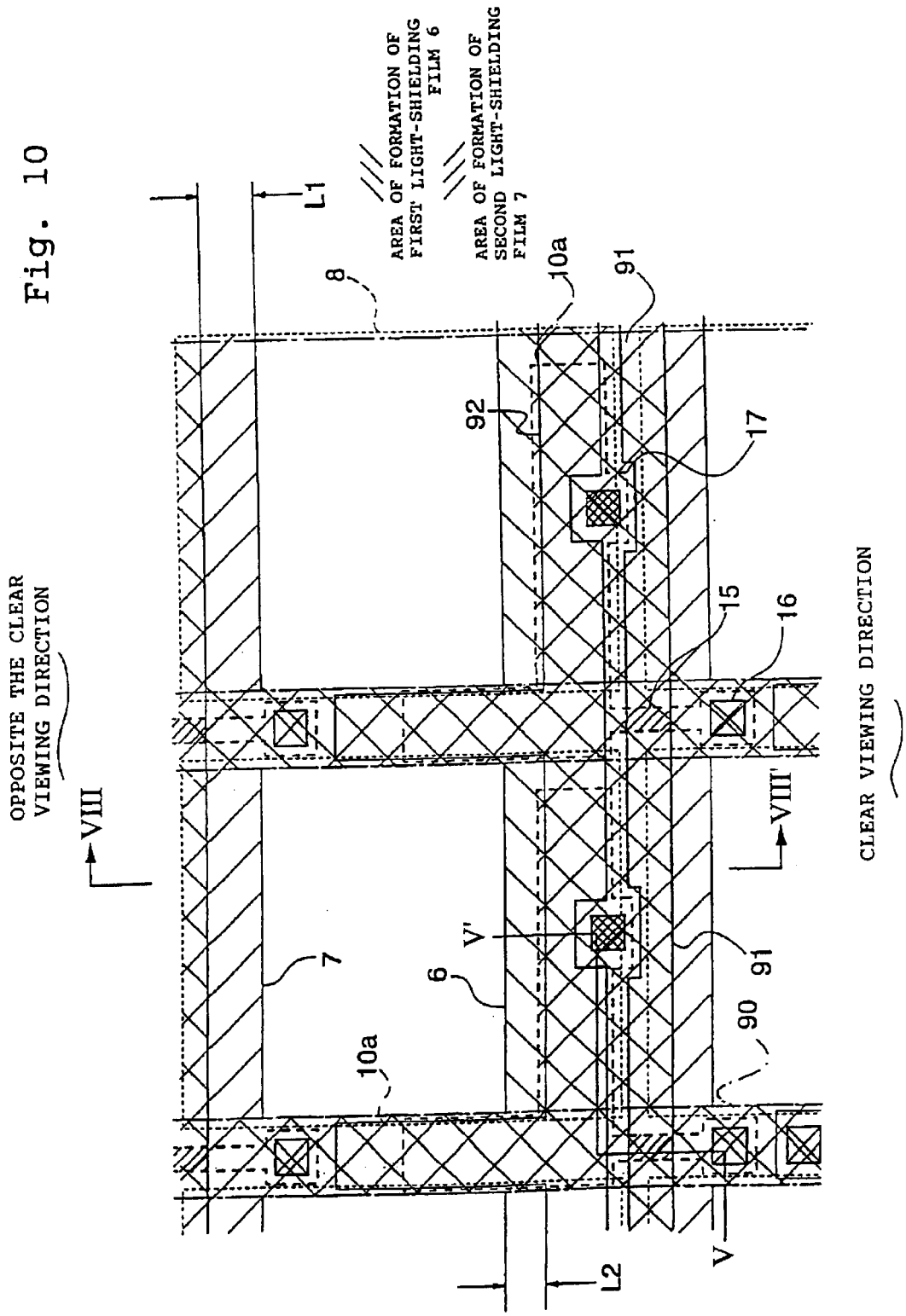
FIG. 10 is a plan view showing the positional relationship between first and second light-shielding films formed on an active matrix substrate and a counter substrate of the liquid crystal device shown in FIG. 9.
Figure 11:
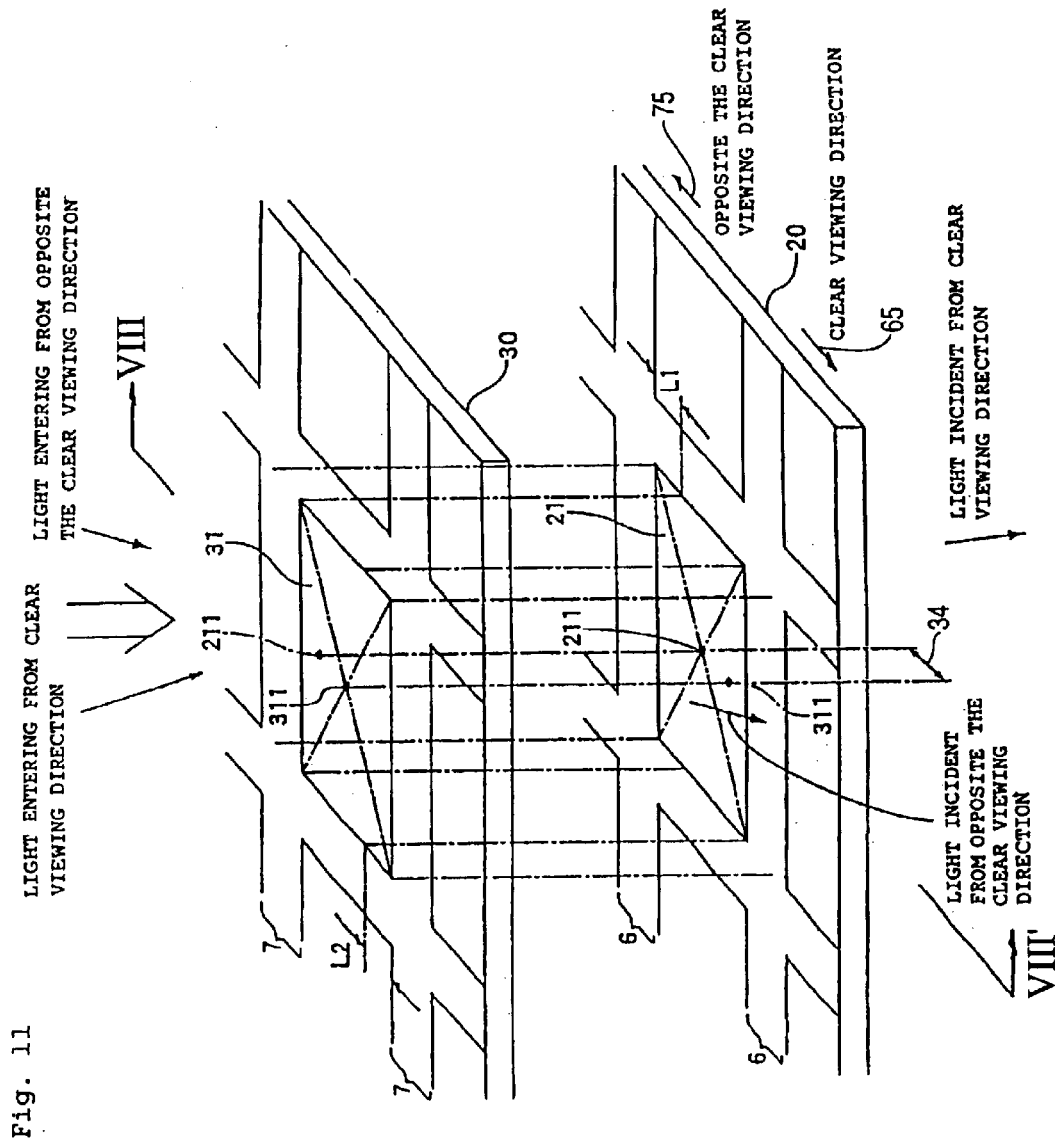
FIG. 11 is an explanatory view showing the positional relationship between the first and second light-shielding films formed on an active matrix substrate and a counter substrate of the liquid crystal device shown in FIG. 9.

FIG. 9 is an enlarged sectional view showing an active matrix substrate, a counter substrate, and a bonding structure of these substrates used in a liquid crystal device 1 according to a second embodiment of the present invention. FIGS. 10 and 11 are a plan view and an explanatory view, respectively, showing the positional relationship between a first light-shielding film 6 formed on an active matrix substrate 20 and a second light-shielding film 7 formed on a counter substrate 30. A cross section shown in FIG. 9 corresponds to a cross section taken along the line VIII—VIII in FIG. 10 and FIG. 11.

In FIG. 9, since the basic configuration of the liquid crystal device 1 of this embodiment is the same as the embodiment 1, only points of difference will be described in detail. In this embodiment, a first light-shielding film 6 is formed on the lower layer of a base protective film 201, and the first-light-shielding film 6 is, as shown by an area of lines sloping down to the left in FIG. 10 formed in a matrix in an area corresponding to an area between adjacent pixel electrodes 8. For this reason, the first light-shielding film 6 is formed in an area which two-dimensionally overlaps the data line 90, the scanning line 91, the capacitor line 92, the TFT 10, and the storage capacitor 40 described with reference to FIG. 5 and a first opening area 21 is partitioned and formed in each pixel on the active matrix substrate 20 by the first light-shielding film 6.

In addition, on the side of the counter substrate 30, a second light-shielding film 7 is formed in a matrix so as to oppose the first light-shielding film 6 of the active matrix substrate 20, and a second opening area 31 is formed by the second light-shielding film 7. The area of formation of the second light-shielding film 7 is shown as an area of lines sloping down to the right in FIG. 10. Furthermore, a counter electrode 32 and an alignment layer 47 are formed on the side of the counter substrate 30.

Liquid crystal 39 is twist-aligned between the thus-configured counter substrate 30 and the active matrix substrate 20. Accordingly, a clear viewing direction 65 and a direction opposite 75 to the clear viewing direction are produced in the liquid crystal device 1 in response to the alignment state of the liquid crystal 39, and if light incident on the liquid crystal device 1 from the direction inclined opposite to the clear viewing direction affects the display, contrast is degraded. In the example shown herein, in each pixel, the side on which the pixel switching TFT is located with respect to the pixel electrode 8 is also a clear viewing direction, and the side opposite thereto is opposite to the clear viewing direction.

In this embodiment, firstly, as is the case in the first embodiment, in each pixel, on the side opposite to the side where the pixel switching TFT 10 is formed (the side opposite to the clear viewing direction), the edge of the second light-shielding film 7 formed on the counter substrate 30 protrudes toward the inside of the pixel from the edge of the first light-shielding film 7 by an amount corresponding to the width L1. For this reason, the second light-shielding film 7 formed on the side of the counter substrate 30 broadly overlaps the first opening area 21 formed on the side of the active matrix substrate 20 from which light is emitted, at the side opposite the clear viewing direction compared to the side of the clear viewing direction.

In addition, in this embodiment, on the side where the pixel switching TFT 10 is formed, the edge of the first light-shielding film 6 formed on the active matrix substrate 20 protrudes toward the inside of the pixel from the edge of the second light-shielding film 7 by an amount corresponding to the width L2. For this reason, the first light-shielding film 6 formed on the side of the active matrix substrate 20 broadly overlaps a second opening area 31 formed on the side of the counter substrate 30, at the side of the clear viewing direction compared to the side opposite to the clear viewing direction.

Accordingly, in the liquid crystal device 1 of this embodiment, of the first and second opening areas 21 and 31, a center position 311 of the second opening area 31 formed on the side of the counter substrate 30 into which light enters is offset by an offset distance 34 toward the clear viewing direction 65 with respect to a center position 211 of the first opening area 21 formed on the side of the active matrix substrate 20 from which light is emitted.

For this reason, in the liquid crystal device 1 of this embodiment, as shown in FIGS. 9 and 11, of the light incident from the side of the counter substrate 30, light incident from the direction inclined in the clear viewing direction is emitted from the first opening area 21 of the active matrix substrate 20 and affects the display; however, light incident on the counter substrate 30 from the direction inclined opposite to the clear viewing direction is illuminated at a position offset from the first opening area 21 with respect to the active matrix substrate 20, and is intercepted by the first light-shielding film 6 located in the clear viewing direction in each pixel so that the light is not emitted from the active matrix substrate 20. Therefore, even if the light incident from the side of the counter substrate 30 contains light inclined in the clear viewing direction and the opposite of the clear viewing direction, since the light inclined opposite to the clear viewing direction that causes the degradation of contrast can be prevented from being emitted from the active matrix substrate 20, the light does not affect the display. Therefore, according to the liquid crystal device 1 to which the present invention is applied, display with high contrast can be effected.

In addition, according to the liquid crystal device 1 of this embodiment, in each pixel, since the pixel switching TFT 10 is also formed on the side of the clear viewing direction with respect to the pixel electrode 8, light incident from the direction inclined opposite to the clear viewing direction can be effectively intercepted. That is, in the active matrix substrate 20, since the first opening area 21 is basically formed by removing the areas of formation of the pixel switching TFT 10 and the storage capacitor 40 from the area rectangularly partitioned by the data line 90, the scanning line 91, and the capacitor line 92, the first light-shielding film 6 protrudes on the side of the formation of the pixel switching TFT 10 by the amount thereof. For this reason, since an area through which light does not pass is wide on the side of the formation of the pixel switching TFT 10 by the amount thereof, light incident from the direction inclined opposite to the clear viewing direction can be intercepted by utilizing the area on which the pixel switching TFT is formed.

Third Embodiment

Figure 12:
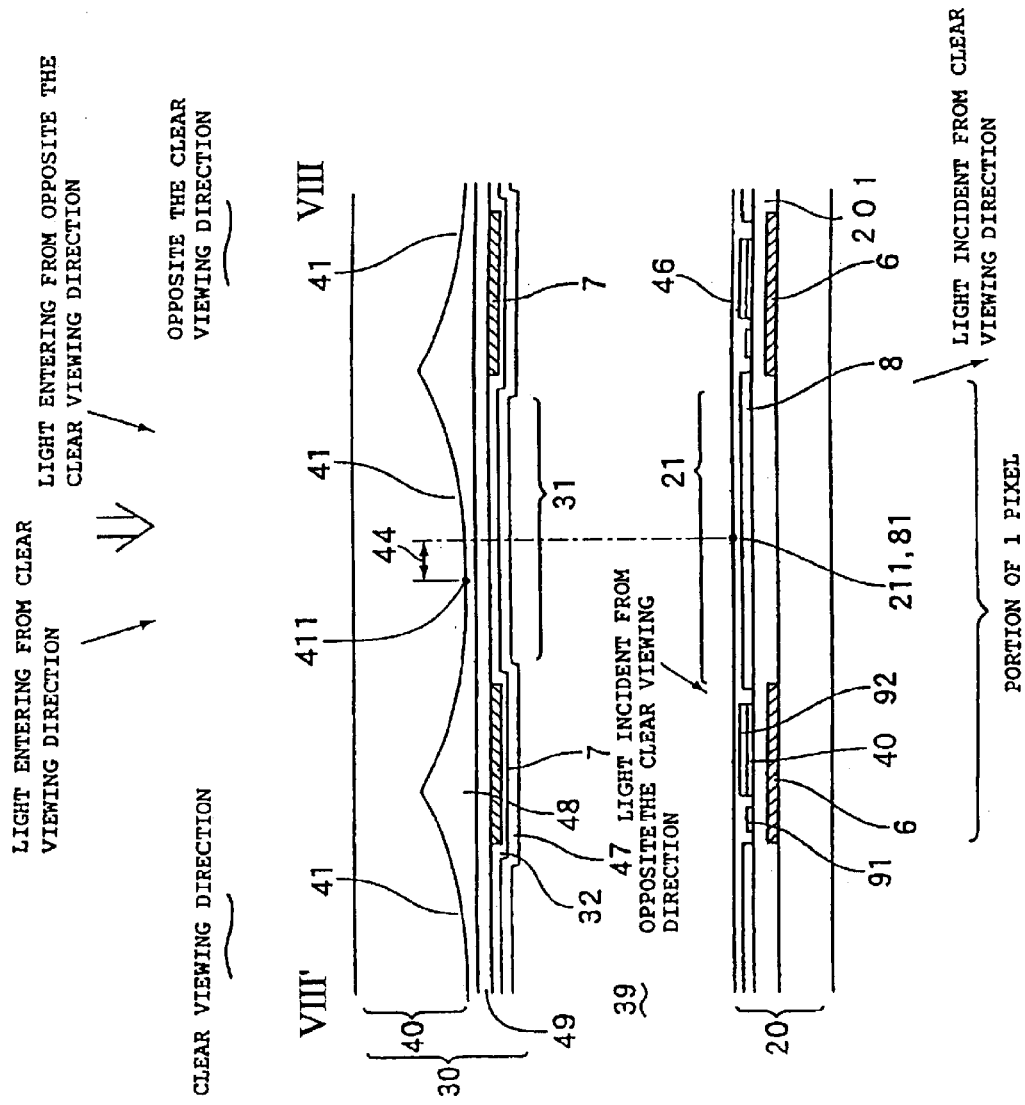
FIG. 12 is an enlarged sectional view showing an active matrix substrate, a counter substrate, and a bonding structure of these substrates in a liquid crystal device according to a third embodiment of the present invention.
Figure 13:
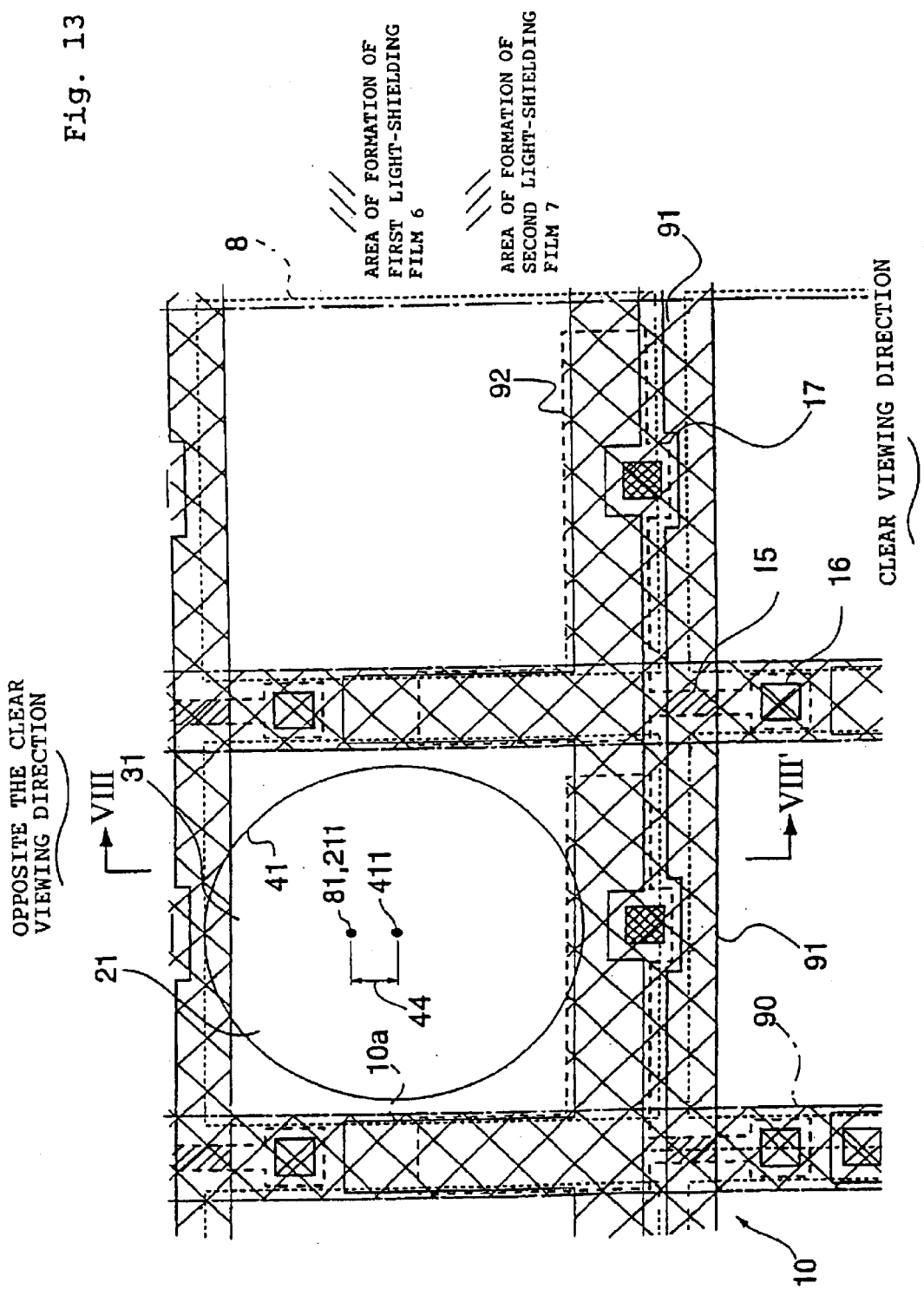
FIG. 13 is a plan view showing the positional relationship between a microlens formed on a counter substrate of a liquid crystal device shown in FIG. 12 and a pixel electrode formed on an active matrix substrate.
Figure 14:
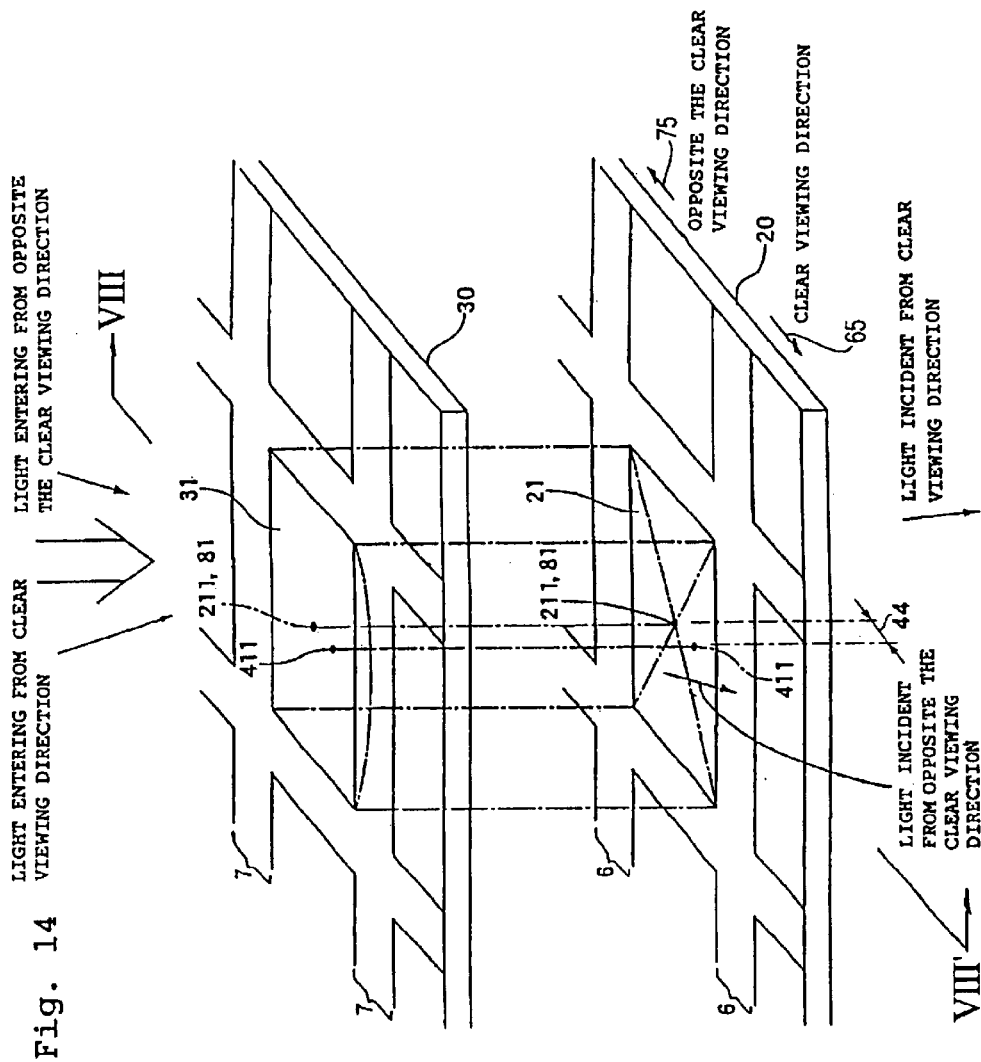
FIG. 14 is an explanatory view showing the positional relationship between the microlens formed on the counter substrate of the liquid crystal device shown in FIG. 12 and the pixel electrode formed on the active matrix substrate.

FIG. 12 is an enlarged sectional view showing an active matrix substrate, a counter substrate, and a bonding structure of these substrates used in a liquid crystal device 1 according to a third embodiment of the present invention. FIGS. 13 and 14 are a plan view and an explanatory view, respectively, showing the positional relationship between a pixel electrode 8 formed on an active matrix substrate 20 and a microlens formed on a counter substrate 30 of the liquid crystal device 1. A cross section shown in FIG. 12 corresponds to a cross section taken along the line VIII—VIII in FIG. 13 and FIG. 14.

In FIG. 12, in the liquid crystal device 1 of this embodiment, on the active matrix substrate 20, a first light-shielding film 6 consisting of a metallic film, such as of chrome, is formed on the lower layer of a base protective film 201, and the first light-shielding film 6 is, as shown by an area of lines sloping down to the left in FIG. 13, formed in a matrix in an area corresponding to an area between adjacent pixel electrodes 8. For this reason, the first light-shielding film 6 is formed in an area which two-dimensionally overlaps the data line 90, the scanning line 91, the capacitor line 92, the TFT 10, and the storage capacitor 40 described with reference to FIGS. 4 and 5, and a first opening area 21 is partitioned and formed in a matrix in each pixel of the active matrix substrate 20 by the first light-shielding film 6.

In addition, on the side of the counter substrate 30, a second light-shielding film 7 is, as shown by an area of lines sloping down to the right in FIG. 13, formed in a matrix so as to oppose the first light-shielding film 6 of the active matrix substrate 20, and a second opening area 31 is partitioned and formed in a matrix by the second light-shielding film 7. In addition, the counter substrate 30 is formed with a microlens 41 in a matrix so as to oppose the pixel electrode 8 of the active matrix substrate 20. The counter substrate 30 having such a structure can be manufactured by, for example, bonding a thin glass plate 49 to a lens array substrate 40 formed with the microlens 41 by a bonding agent 48, and by forming the second light-shielding film 7, a transparent counter electrode 32, and an alignment layer 47 on the thin glass plate 49.

After rubbing treatment is applied to the thus-configured counter substrate 30 and the active matrix substrate 20 in directions perpendicular to each other, the substrates 30 and 20 are bonded with a predetermined gap therebetween, and thereafter, liquid crystal 39 is sealed in the gap. As a result, the liquid crystal 39 is twist-aligned 90° between the active matrix substrate 20 and the counter substrate 30. Accordingly, a clear viewing direction 65 and a direction opposite to the clear viewing direction 75 are produced in the liquid crystal device 1 in response to the alignment state of the liquid crystal 39, and if light incident on the liquid crystal device 1 from the direction inclined opposite to the clear viewing direction affects the display, contrast is degraded. In the example shown herein, in each pixel, the side on which the pixel switching TFT 10 is located with respect to the pixel electrode 8 (the lower side in the figure) is a clear viewing direction 65, and the side opposite thereto (the upper side in the figure) is opposite 75 to the clear viewing direction.

In this embodiment, as shown in FIGS. 12, 13, and 14, a focal position 411 of the microlens 41 formed on the counter substrate 30 is offset by an offset distance 44 toward the clear viewing direction 65 with respect to the center position 211 of the first opening area 21 of the active matrix substrate 20.

For this reason, in the liquid crystal device 1 of this embodiment, as shown in FIGS. 12 and 14, of the light incident from the side of the counter substrate 30, light incident from the direction inclined toward the clear viewing direction is emitted from the first opening area 21 of the active matrix substrate 20 and affects the display, even if it is refracted by the microlens 41. In contrast, light incident on the counter substrate 30 from the direction inclined toward the opposite of the clear viewing direction is illuminated on the active matrix substrate 20 at a position offset from the first opening area 21 after being refracted by the microlens 41, and the light is intercepted by the first light-shielding film 6 located on the side of the clear viewing direction in each pixel, so that the light can be prevented from being emitted from the active matrix substrate 20. Therefore, even if the light incident from the side of the counter substrate 30 contains light inclined in the clear viewing direction and opposite to the clear viewing direction, since the light inclined opposite to the clear viewing direction that causes the degradation of contrast can be prevented from being emitted from the active matrix substrate 20, the light does not affect the display. Therefore, according to the liquid crystal device 1 to which the present invention is applied, display with high contrast can be effected.

In addition, according to the liquid crystal device 1 of this embodiment, in each pixel, since the pixel switching TFT 10 is formed on the side of the clear viewing direction with respect to the pixel electrode 8, light incident from the direction inclined toward the opposite of the clear viewing direction can be effectively intercepted. That is, in the active matrix substrate 20, since the first opening area 21 is basically formed by removing the area of formation of the pixel switching TFT 10 and the storage capacitor 40 from the area rectangularly partitioned by the data line 90, the scanning line 91, and the capacitor line 92, the first light-shielding 6 protrudes on the side of the formation of the pixel switching TFT 10 by the amount thereof. For this reason, since an area through which light does not pass is wide on the side of the formation of the pixel switching TFT 10 by the amount thereof, light incident from the direction inclined opposite to the clear viewing direction can be intercepted utilizing the area on which the pixel switching TFT 10 is formed. While the counter substrate 30 is formed with the microlens in this embodiment, the microlens may be provided corresponding to each pixel of the active matrix substrate 20. In addition, both the counter substrate 30 and the active matrix substrate 20 may be formed with the microlens. In this case, the microlens formed on the active matrix substrate 20 can collimate or diffuse the light incident on the liquid crystal device at an angle from the side of the clear viewing direction, so that the opening ratio of the pixel can be substantially increased. In addition, the light may be enlarged or converged according to the purpose. In addition, if an optical center position of the microlens formed on the counter substrate 30 is offset toward the clear viewing direction, and an optical center position of the microlens formed on the active matrix substrate 20 is offset toward the clear viewing direction so that focal positions thereof coincide with each other, light utilization efficiency can be improved.

Fourth Embodiment

Figure 15:
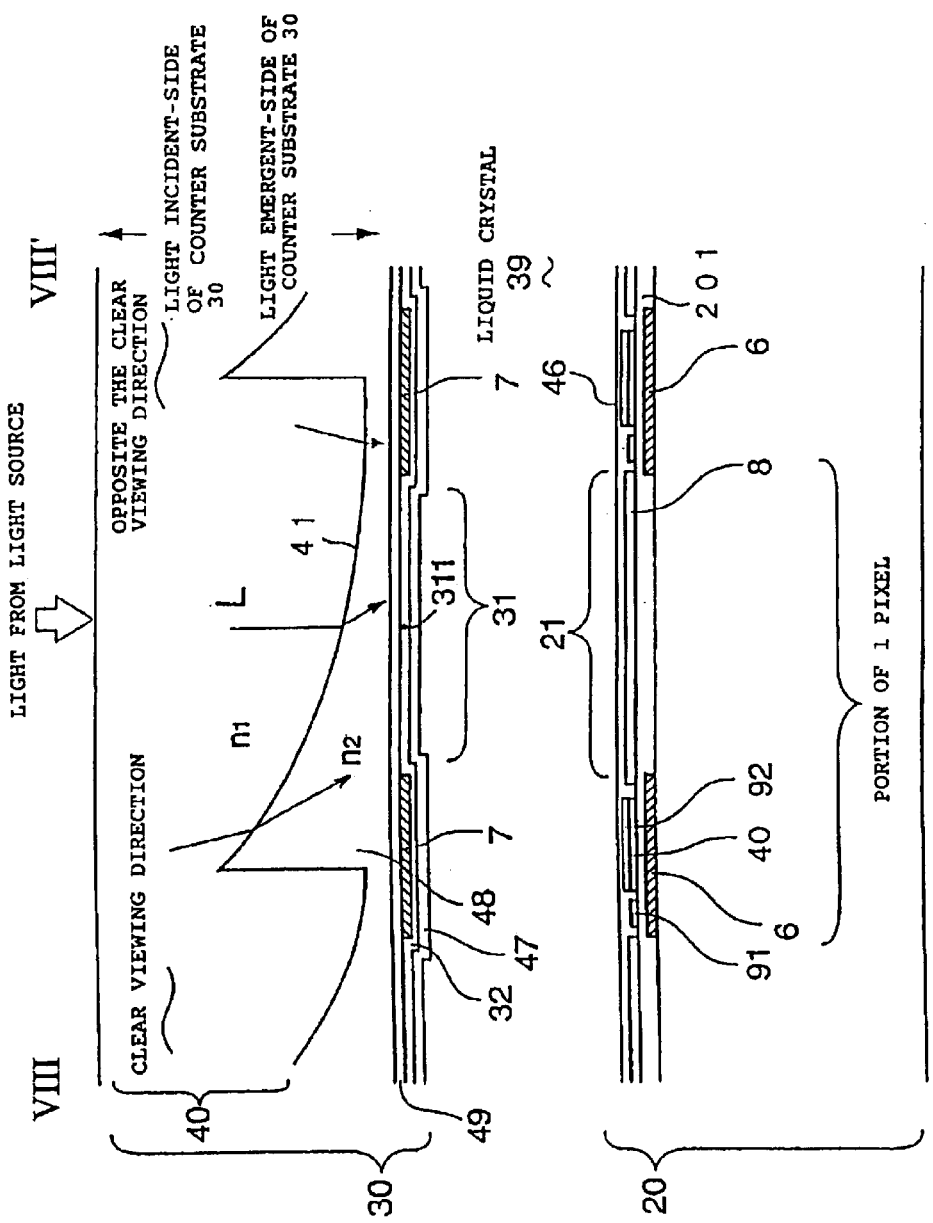
FIG. 15 is an enlarged sectional view showing an active matrix substrate, a counter substrate, and a bonding structure of these substrates in a liquid crystal device according to a fourth embodiment of the present invention.

FIG. 15 is an enlarged sectional view showing an active matrix substrate, a counter substrate, and a bonding structure of these substrates used in a liquid crystal device 1 according to a fourth embodiment of the present invention, and corresponds to a sectional view taken along the line VIII—VIII in FIG. 14.

In FIG. 15, in the liquid crystal device 1 of this embodiment, on an active matrix substrate 20, a first light-shielding film 6 consisting of a metallic film, such as of chrome, is formed on the lower layer of a base protective film 201, and the first light-shielding film 6 is formed in a matrix in an area corresponding to an area between adjacent pixel electrodes 8. For this reason, the first light-shielding film 6 is formed in an area which two-dimensionally overlaps the data line 90, the scanning line 91, the capacitor line 92, the TFT 10, and the storage capacitor 40 described with reference to FIG. 5, and a first opening area 21 is partitioned and formed in a matrix in each pixel of the active matrix substrate 20 by the first light-shielding film 6.

A counter substrate 30 is formed with a second light-shielding film 7 in a matrix so as to oppose the first light-shielding film 6 of the active matrix substrate 20, and a second opening area 31 is partitioned and formed in a matrix by the second light-shielding film 7. In addition, the counter substrate 30 is formed with a microlens 41 in a matrix so as to oppose pixel electrode 8 of the active matrix substrate 20. For this reason, since the microlens 41 allows the light L from a light source incident on the counter substrate 30 to enter liquid crystal 39 while condensing the light, the amount of light intercepted by the first light-shielding film 6 can be decreased. Therefore, light utilization efficiency is high, so that bright display can be effected.

The counter substrate 30 having such a structure can be manufactured by, for example, bonding a thin glass plate 49 to a transparent lens array substrate 40, which is formed with the microlens 41 utilizing a photolithographic technology, by a bonding agent 48, and by forming a second light-shielding film 7, a transparent counter electrode 32, and an alignment layer 47 on the thin glass plate 49.

After rubbing treatment is applied to the thus-configured counter substrate 30 and the active matrix substrate 20 in directions perpendicular to each other, the substrates 30 and 20 are bonded with a predetermined gap therebetween, and thereafter, liquid crystal 39 is sealed in the gap. As a result, the liquid crystal 39 is twist-aligned 90° between the active matrix substrate 20 and the counter substrate 30. Accordingly, since a clear viewing direction and a direction opposite to the clear viewing direction are produced in the liquid crystal device 1, and if light enters into the layer of the liquid crystal 39 from the clear viewing direction, contrast is improved. In the example shown herein, the left side in the figure is the clear viewing direction, and the right side is opposite to the clear viewing direction.

In this embodiment, assuming that the refractive index of the lens array substrate 40 is $n_1$, and the refractive index of the bonding agent 48 is $n_2$, the lens array substrate 40 and the bonding agent 48 are formed of materials satisfying the relationship $$n_1 > n_2,$$

and, on the portion corresponding to the microlens 41, the lens array substrate 40 is formed with corrugations so that the thickness of the bonding agent 48 is continuously reduced from the side of the clear viewing direction toward the opposite of the clear viewing direction. That is, a high-refractive index layer (lens array substrate 40) is arranged on the light incident-side of the counter substrate 30 formed with the microlens 41, a low-refractive index layer (layer of the bonding agent 48) is formed on the light-emitting side of the counter substrate 30, and the configuration of the microlens 41 is such that the thickness of the low-refractive index layer (layer of the bonding agent 48) is continuously increased from the center of a pixel 311 toward the side of the clear viewing direction, is continuously reduced toward the opposite of the clear viewing direction, and is steeply increased again at a boundary area (area in which the light-shielding film 7 is formed) between adjacent pixels to the thickness on the side of the clear viewing direction.

Accordingly, in the liquid crystal device 1 of this embodiment, of the active matrix substrate 20 and the counter substrate 30, since the counter substrate 30 into which light enters is formed with the microlens 41, light utilization efficiency can be improved. In addition, since the microlens 41 has asymmetric optical characteristics, of the light incident on the counter substrate 30 from the clear viewing direction, light travelling toward the first light-shielding film 6 located on the side of the clear viewing direction with respect to the pixel is bent by the microlens 41 in a direction to avoid the first light-shielding film 6 and to be emitted to the liquid crystal 39 with almost no interception by the first light-shielding film 6, whereas, of the light incident on the counter substrate 30 from opposite the clear viewing direction, light travelling toward the first light-shielding film 6 located on the side opposite the clear viewing direction with respect to the pixel, is bent by the microlens 41 toward the first light-shielding film 6, and a part of the light is intercepted by the first light-shielding film 6. For this reason, it is possible to increase the amount of light incident on the liquid crystal 39 from the clear viewing direction and to decrease the amount of light incident from opposite the clear viewing direction, so that display with high contrast can be effected by the liquid crystal device 1 of this embodiment.

Modification of Fourth Embodiment

Figure 16:
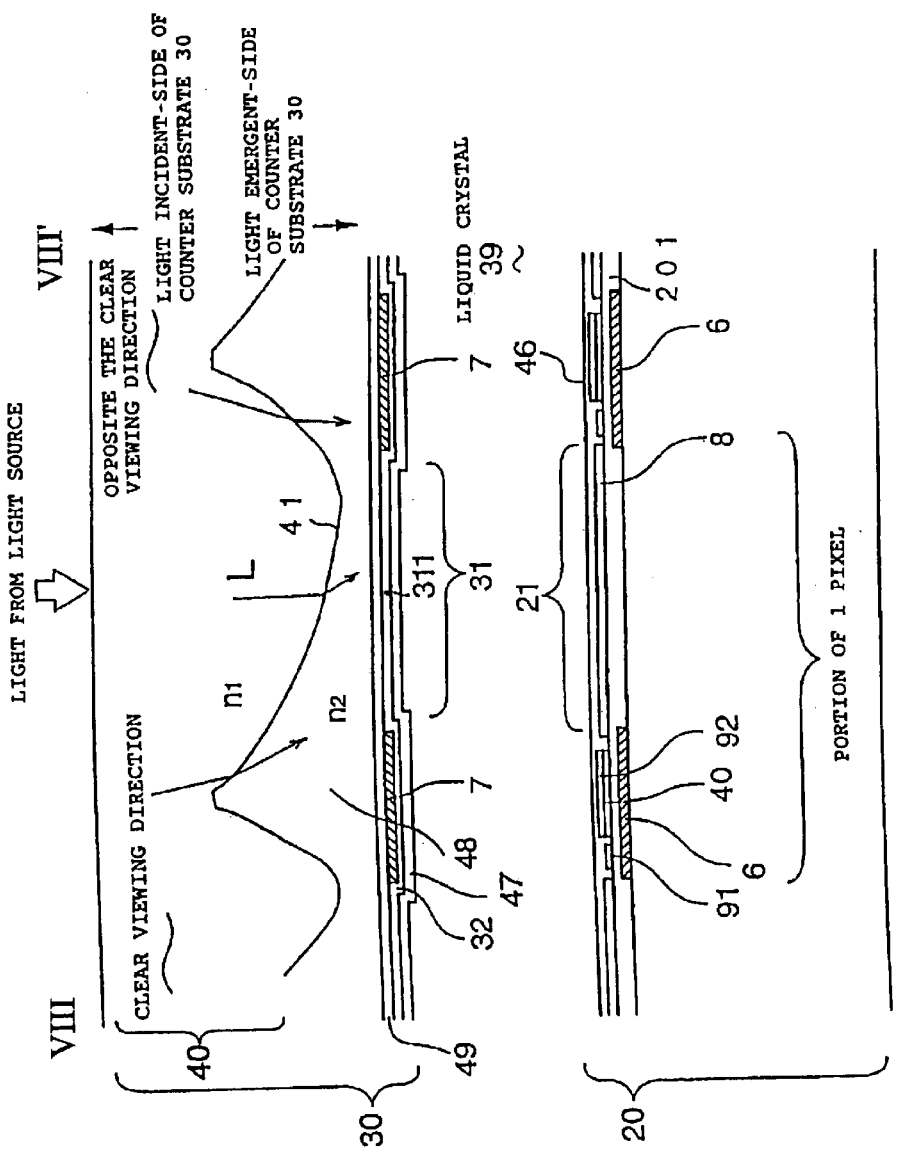
FIG. 16 is an enlarged sectional view showing an active matrix substrate, a counter substrate, and a bonding structure of these substrate in a liquid crystal device according to a modification of the fourth embodiment of the present invention.

FIG. 16 is an enlarged sectional view showing an active matrix substrate 20, a counter substrate 30 and a bonding structure of these substrates used in a liquid crystal device 1 according to a modification of the fourth embodiment. Since the basic configuration of this modification and embodiments described below is common to the fourth embodiment, corresponding parts are shown in the figure by indicating the same reference numerals, and detailed description thereof will be omitted.

In FIG. 16, in the liquid crystal device 1 of this embodiment, the counter substrate is also formed with a microlens 41 in a matrix so as to oppose a pixel electrode 8 of the active matrix substrate 20.

In addition, since a clear viewing direction and a direction opposite to the clear viewing direction are also produced in the liquid crystal device 1 in response to the alignment state of liquid crystal 39, contrast is improved when a large amount of light is incident on the liquid crystal 39 from the clear viewing direction.

In this embodiment, as is the fourth embodiment, assuming that the refractive index of the lens array substrate 40 is $n_1$, and the refractive index of the bonding agent 48 is $n_2$, the lens array substrate 40 (high-refractive index layer) and the bonding agent 48 (low-refractive index layer) satisfying the relationship:

$$n_1 > n_2$$

are used, and on the portion corresponding to the microlens 41, the lens array substrate 40 is formed with corrugations so that the thickness of the bonding agent 48 is continuously reduced from a pixel center 311 toward the clear viewing direction, and is continuously reduced toward the opposite of the clear viewing direction. Unlike in the fourth embodiment, however, the configuration is such that, on the portion of the microlens 41, the thickness of the bonding agent 48 (low-refractive index layer) is continuously reduced from the side of the clear viewing direction toward the opposite of the clear viewing direction, and is gradually returned to the thickness on the side of the clear viewing direction from the vicinity of a boundary area (area on which a light-shielding film 7 is formed) between adjacent pixels.

Even in the case of this configuration, since the counter substrate 30 into which light enters is formed with the microlens 41, light utilization efficiency can be improved. Also, since the microlens 41 has asymmetric optical characteristics, as is the fourth embodiment, it is possible to increase the amount of light incident on the liquid crystal 39 from the clear viewing direction and to decrease the amount of light incident from opposite the clear viewing direction, so that display with high contrast can be effected by the liquid crystal device 1 of this embodiment.

In addition, since the interface between the lens array substrate 40 (high-refractive index layer) and the bonding agent 48 (low-refractive index layer) in the microlens 41 has a curved shape even on the side opposite to the clear viewing direction, a small amount of light on the side opposite to the clear viewing direction is contained therein; however, compared to the fourth embodiment, a larger amount of light can be emitted toward the liquid crystal 39. Therefore, bright display can be effected.

Fifth Embodiment

Figure 17:
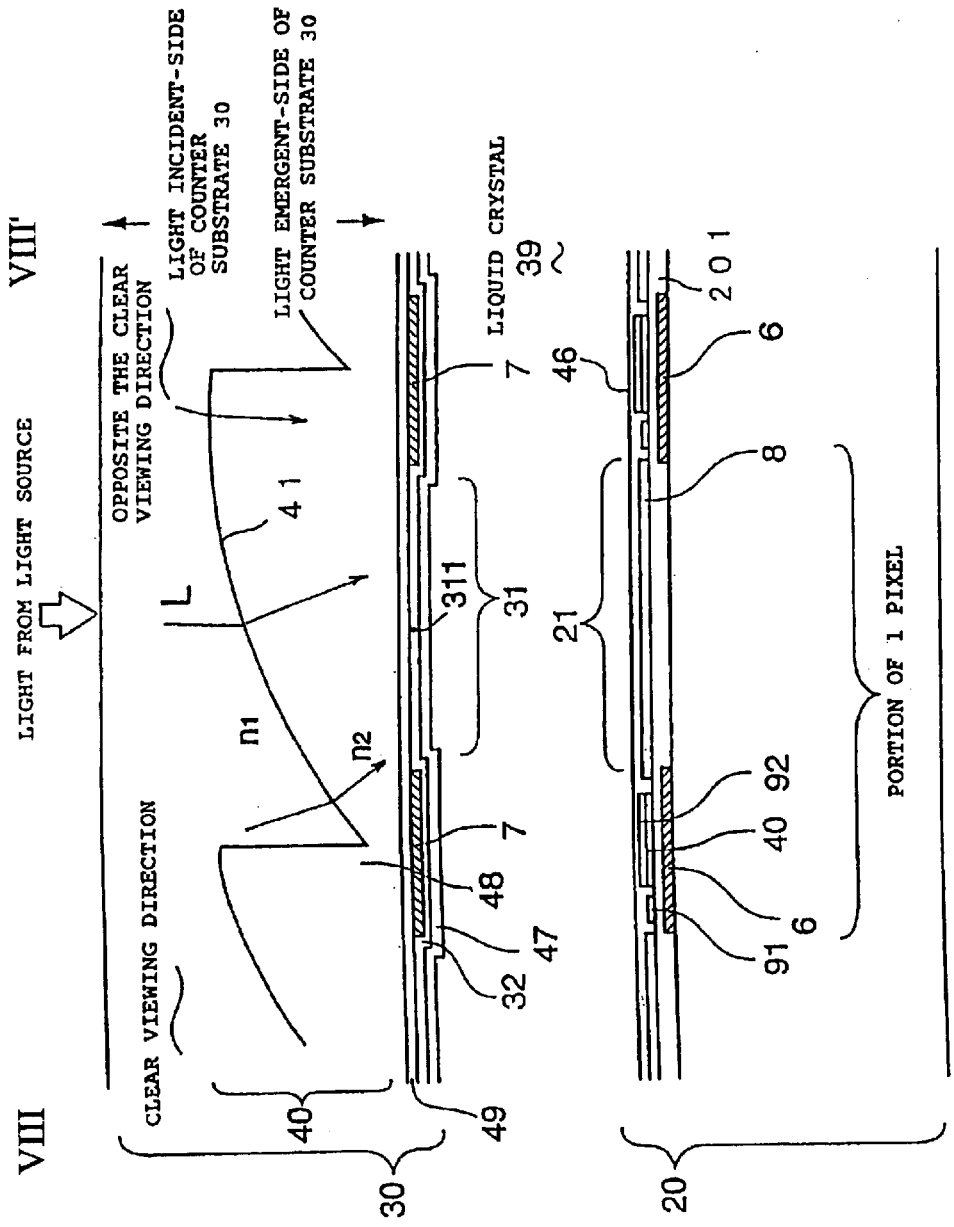
FIG. 17 is an enlarged sectional view showing an active matrix substrate, a counter substrate, and a bonding structure of these substrates in a liquid crystal device according to a fifth embodiment of the present invention.

FIG. 17 is an enlarged sectional view showing an active matrix substrate, a counter substrate, and a bonding structure of these substrates used in a liquid crystal device 1 according to a fifth embodiment of the present invention. The basic configuration of the fifth embodiment is common to the above embodiments, and the same components are indicated by the same reference numerals, and description thereof will be omitted.

In FIG. 17, in the liquid crystal device 1 of this embodiment, a counter substrate 30 is also formed with a microlens in a matrix so as to oppose a pixel electrode 8 of an active matrix substrate 20. The counter substrate 30 having such a structure can also be manufactured by bonding a thin glass plate 49 to a lens array substrate 40 formed with the microlens 41 by a bonding agent 48, and by forming a second light-shielding film 7, a transparent counter electrode 32, and an alignment layer 47 on the thin glass plate 49. In addition, since a clear viewing direction and a direction opposite to the clear viewing direction are also produced in the liquid crystal device 1 in response to the alignment state of liquid crystal 39, contrast is improved when light enters into a layer of the liquid crystal 39 from the clear viewing direction.

In this embodiment, assuming that the refractive index of the lens array substrate 40 is $n_1$, and the refractive index of the bonding agent 48 is $n_2$, the lens array substrate 40 and the bonding agent 48 satisfying the relationship:

$$n_1 < n_2$$

are used, and on the portion corresponding to the microlens 41, the lens array substrate 40 is formed with corrugations so that the thickness of the bonding agent 48 is continuously reduced from the side of the clear viewing direction toward the opposite of the clear viewing direction. That is, a low-refractive index layer (lens array substrate 40) is arranged on the light incident-side of the counter substrate 30 formed with the microlens 41, a high-refractive index layer (layer of the bonding agent 48) is formed on the light emitting-side of the counter substrate 30, and in the portion of the microlens 41, the configuration is such that the thickness of the high-refractive index layer is continuously reduced from a pixel center 311 toward the clear viewing direction, and is steeply increased again at a boundary area (area in which the light-shielding film 7 is formed) between adjacent pixels to the thickness on the side of the clear viewing direction.

Accordingly, since the counter substrate 30 into which light enters is also formed with the microlens 41 in this embodiment, light utilization efficiency can be improved. In addition, since the microlens 41 has asymmetric optical characteristics, of the light incident on the counter substrate 30 from the clear viewing direction, light travelling toward the first light-shielding film 6 located on the side of the clear viewing direction with respect to the pixel is bent by the microlens 41 in a direction to avoid the first light-shielding film 6 and to be emitted to the liquid crystal 39 with almost no interception by the first light-shielding film 6, whereas, of the light incident on the counter substrate 30 from opposite the clear viewing direction, light travelling toward the first light-shielding located on the side opposite the clear viewing direction with respect to the pixel is bent by the microlens 41 toward the first light-shielding film 6, and a part of the light is intercepted by the first light-shielding film 6. For this reason, it is possible to increase the amount of light incident on the liquid crystal 39 from the clear viewing direction and to decrease the amount of light incident from opposite the clear viewing direction, so that display with high contrast can be effected by the liquid crystal device 1 of this embodiment.

Modification of Fifth Embodiment

FIG. 18 is an enlarged sectional view showing an active matrix substrate, a counter substrate, and a bonding structure of these substrates used in a liquid crystal device 1 according to a modification of the fifth embodiment of the present invention.

In FIG. 18, in the liquid crystal device 1 of this embodiment, the counter substrate 30 is also formed with a microlens 41 in a matrix so as to oppose a pixel electrode 8 of the active matrix substrate 20. In addition, since a clear viewing direction and a direction opposite to the clear viewing direction are also produced in the liquid crystal device 1 in response to the alignment state of liquid crystal 39, contrast is improved when light enters a layer of the liquid crystal 39 from the clear viewing direction.

In this embodiment, as is the fifth embodiment, assuming that the refractive index of a lens array substrate 40 is $n_1$, and the refractive index of a bonding agent 48 is $n_2$, the lens array substrate 40 (low-refractive index layer) and the bonding agent 48 (high-refractive index layer) satisfying the relationship:

$$n_1 < n_2$$

are used, and in the microlens 41, the lens array substrate 40 is formed with corrugations so that the thickness of the bonding agent 48 is continuously increased from the side of the clear viewing direction toward the opposite of the clear viewing direction. Accordingly, unlike in the fifth embodiment, the configuration of the microlens 41 is such that the thickness of the bonding agent 48 (high-refractive index layer) is continuously increased from the side of the clear viewing direction toward the opposite of the clear viewing direction, and is gradually returned to the thickness on the side of the clear viewing direction from the vicinity of a boundary area (area in which a light-shielding film 7 is formed) between adjacent pixels.

Even in the case of this configuration, since the counter substrate 30 into which light enters is formed with the microlens 41, light utilization efficiency can be improved. In addition, since the microlens 41 has asymmetric optical characteristics, as is the fifth embodiment, it is possible to increase the amount of light incident on the liquid crystal 39 from the clear viewing direction and to decrease the amount of light incident from opposite the clear viewing direction, so that display with high contrast can be effected by the liquid crystal device 1 of this embodiment.

In addition, since the interface between the lens array substrate 40 (low-refractive index layer) and the bonding agent 48 (high-refractive index layer) in the microlens 41 has a curved shape even on the side opposite to the clear viewing direction, a small amount of light on the side opposite to the clear viewing direction is contained therein; however, compared to the fifth embodiment, a larger amount of light can be emitted toward the liquid crystal 39. Therefore, bright display can be effected.

Sixth Embodiment

FIG. 19 is an enlarged sectional view showing an active matrix substrate, a counter substrate, and a bonding structure of these substrates used in a liquid crystal device 1 according to a sixth embodiment of the present invention. Since the basic structure of the sixth embodiment is common to the fourth embodiment, the same components are indicated by the same reference numerals, and a description thereof will be omitted.

In FIG. 19, in the liquid crystal device 1 of this embodiment, a counter substrate 30 is also formed with a second light-shielding film 7 in a matrix so as to oppose a first light-shielding film 6 of an active matrix substrate 20, and a second opening area 31 is partitioned and formed in a matrix by the second light-shielding film 7. In addition, the counter substrate 30 is formed with a microlens 41 in a matrix so as to oppose a pixel electrode 8 of the active matrix substrate 20. The counter substrate 30 having such a structure can be manufactured by, for example, bonding a thin glass plate 49 to a lens array substrate 40 formed with a microlens 41 by a bonding agent 48, and by forming the second light-shielding film 7, a transparent counter electrode 32, and an alignment layer 47 on the thin glass plate 49. Since a clear viewing direction and a direction opposite to the clear viewing direction are also produced in the liquid crystal device 1 in response to the alignment state of liquid crystal 39, contrast is improved when light enters a layer of the liquid crystal 39 from the clear viewing direction.

In this embodiment, a configuration is such that a medium-refractive index layer 40A consisting of a basic transparent substrate is arranged on the lens array substrate 40 of the counter substrate 30 at the light incident-side thereof, and a low-refractive index layer 40B and a high-refractive index layer 40C are adjacent to the transparent substrate at the side of the clear viewing direction and at the side of opposite the clear viewing direction, respectively, on the light emitting-side. The low-refractive index layer 40B and the high-refractive index layer 40C are transparent resin layers stacked on the surface of the basic transparent substrate (medium-refractive index layer 40A) formed with corrugations. In addition, on the portion of the microlens 41, the low-refractive index layer 40B and the high-refractive index layer 40C are continuously and symmetrically thickened from a pixel center 311 toward the clear viewing direction and toward the opposite of the clear viewing direction, respectively. That is, assuming that the refractive indexes of the medium-refractive index layer 40A, the low-refractive index layer 40B, and the high-refractive index layer 40C constituting the lens array substrate 40 are $n_{11}$, $n_{12}$, and $n_{13}$, respectively, the lens array substrate 40 is configured so as to satisfy the relationship:

$$n_{12} < n_{11} < n_{13},$$

and on the portion corresponding to the microlens 41, the low-refractive index layer 40B is gently increased in thickness from the pixel center 311 toward the clear viewing direction, and the high-refractive index layer 40C is gently increased in thickness from the pixel center 311 toward the opposite of the clear viewing direction.

Even in the thus-configured liquid crystal device 1, since the counter substrate 30 into which light enters is formed with the microlens 41, light utilization efficiency can be improved. In addition, since the microlens 41 has asymmetrical optical characteristics, of the light incident on the counter substrate 30 from the clear viewing direction, light travelling toward the first light-shielding film 6 located on the side of the clear viewing direction with respect to the pixel is bent by the microlens 41 in a direction to avoid the first light-shielding film 6 and to be emitted toward the liquid crystal 39 with almost no interception by the first light-shielding film 6, whereas, of the light incident on the counter substrate 30 from opposite the clear viewing direction, light travelling toward the first light-shielding film 6 located on the side opposite the clear viewing direction with respect to the pixel is bent by the microlens 41 toward the first light-shielding film 6, and a part of the light is intercepted by the first light-shielding film 6. For this reason, it is possible to increase the amount of light incident on the liquid crystal 39 from the clear viewing direction and to decrease the amount of light incident from opposite the clear viewing direction, so that display with high contrast can be effected by the liquid crystal device 1 of this embodiment.

Seventh Embodiment

FIG. 20 is an enlarged sectional view showing an active matrix substrate, a counter substrate, and a bonding structure of these substrates used in a liquid crystal device 1 according to a seventh embodiment of the present invention. Since the basic structure of the seventh embodiment is common to the fourth embodiment, the same components are indicated by the same reference numerals, and a description thereof will be omitted.

In FIG. 20, in the liquid crystal device 1 of this embodiment, as is the sixth embodiment, a counter substrate 30 is formed with a microlens 41 in a matrix so as to oppose a pixel electrode 8 of an active matrix substrate 20. The counter substrate 30 having such a structure can be manufactured by, for example, bonding a thin glass plate 49 to a lens array substrate 40 formed with a microlens 41 by a bonding agent 48, and by forming a second light-shielding film 7, a transparent counter electrode 32, and an alignment layer 47 on the thin glass plate 49. Since a clear viewing direction and a direction opposite to the clear viewing direction are also produced in the liquid crystal device 1 in response to the alignment state of liquid crystal 39, contrast is improved when light enters a layer of the liquid crystal 39 from the clear viewing direction.

In this embodiment, a medium-refractive index layer 40A is formed on the lens array substrate 40 of the counter substrate 30 at the light incident-side, a high-refractive index layer 40C and a low-refractive index layer 40B are formed so as to be adjacent to the substrate at the side of the clear viewing direction and at the side opposite to the clear viewing direction, respectively, on the light emitting-side, and on the portion of the microlens 41, the high-refractive index layer 40C and the low-refractive index layer 40B are continuously and symmetrically increased in thickness from a pixel center 311 toward the clear viewing direction and toward the opposite of the clear viewing direction, respectively. That is, assuming that the refractive indexes of the medium-refractive index layer 40A, the low-refractive index layer 40B, and the high-refractive index layer 40C constituting the lens array substrate 40 are $n_{11}$, $n_{12}$, and $n_{13}$, respectively, the lens array substrate 40 is configured so as to satisfy the relationship:

$$n_{12} < n_{11} < n_{13},$$

and on the portion corresponding to the microlens 41, the high-refractive index layer 40C is gently reduced in thickness from the pixel center 311 toward the clear viewing direction, and the low-refractive index layer 40B is gently reduced in thickness from the pixel center 311 toward the opposite of the clear viewing direction Accordingly, since the counter substrate 30 into which light enters is formed with the microlens 41, light utilization efficiency can be improved. In addition, since the microlens 41 has asymmetrical optical characteristics, as is in the sixth embodiment, it is possible to increase the amount of light incident on the liquid crystal 39 from the clear viewing direction and to decrease the amount of light incident from opposite the clear viewing direction, so that display with high contrast can be effected by the liquid crystal device 1 of this embodiment.

Eighth Embodiment

FIG. 21 is an enlarged sectional view showing an active matrix substrate, a counter substrate, and a bonding structure of these substrates used in a liquid crystal device 1 according to an eighth embodiment of the present invention. Since the basic structure of the eighth embodiment is common to the fourth embodiment, the same components are indicated by the same reference numerals, and description thereof will be omitted.

The example shown in FIG. 21 is based on the liquid crystal device 1 shown in FIG. 19, and the configuration of the microlens 41 is changed. That is, in this liquid crystal device 1, as is the sixth embodiment, a counter substrate 30 is formed with a microlens 41, so that light utilization efficiency is high.

The microlens 41 bends, of the light incident on the counter substrate 30, a direction of light travelling toward a first light-shielding film 6 to an opening area of a pixel, thereby improving light utilization efficiency. Accordingly, since the light originally travelling toward a pixel center 311 is incident on the pixel opening area even without the provision of the microlens 41, the microlens may not be formed in response to a center area of the pixel. In this embodiment, in the center area of the pixel, an area in which a microlens is not formed, that is, a non-lens area 400 is formed to allow the light perpendicularly incident on the counter substrate 30 to travel in a straight line, and a microlens 41 having a shape such that a bonding agent 48 is increased in thickness from he side near the pixel center 311 toward the periphery is formed in a peripheral area of the pixel. In this embodiment, assuming that the refractive index of the microlens array 40 is n1 and the refractive index of the bonding agent 48 is n2, if the microlens array substrate 40 and the bonding agent 48 are formed by materials satisfying the relationship:

$$n1 > n2,$$

light travelling toward a light-shielding film or a wiring around the pixel can be directed to the pixel center. Therefore, light utilization efficiency can be improved and the amount of light incident from the opposite of the clear viewing direction can be decreased, so that display with high contrast can be effected.

The shape such that the center of the pixel is the non-lens area 400 is formed by flattening the pixel center area so that the periphery of the pixel has a predetermined curvature, as shown in FIG. 21. In this case, a little bit of the bonding agent 48 may be provided between the non-lens area 400 and the thin glass plate 49. If the bonding agent 48 is coated on the entire surface of the microlens array substrate 40 by being reduced in thickness at the center area and increased in thickness at the peripheral area between the non-lens area 400 of the center area of the pixel and the thin glass plate 49, adhesion between the thin glass plate 49 and the microlens array 40 can be enhanced. In addition, since the pixel center area has a flat surface and the microlens is formed only on the pixel peripheral area, radiated light incident on the pixel center area can pass the pixel in a state of divergence in some degree without being condensed on one point of the pixel center of the liquid crystal. Accordingly, the incident light can be prevented from being locally radiated, and the service life of the liquid crystal can be extended First Modification of Eighth Embodiment FIG. 22 is an enlarged sectional view showing an active matrix substrate, a counter substrate, and a bonding structure of these substrates used in a liquid crystal device 1 according to a first modification of the eighth embodiment. Since the basic structure of the first modification is common to the eighth embodiment, the same components are indicated by the same reference numerals, and description thereof will be omitted.

This modification differs from the eighth embodiment in that in a microlens 41 having a convex shape, a non-lens area 400 formed in the center of a pixel is in contact with a thin glass plate 49 without the aid of a bonding agent 48, and other configurations are the same as the eighth embodiment.

With the configuration shown in FIG. 22, light to be incident on the non-lens area 400 of the center area of the pixel can be incident on liquid crystal without the aid of the bonding agent 48. Therefore, light to be incident on the pixel center can travel toward the liquid crystal without being bent by the bonding agent, light utilization efficiency can be improved, and the amount of light incident from the opposite of the clear viewing direction can be decreased, so that display with high contrast can be effected.

In addition, since a flat surface of the non-lens area 400 in the microlens array substrate 40 is in contact with and fixed to the thin glass plate 49, a gap between the microlens array substrate 40 and the thin glass plate 49 can be kept constant. Therefore, the microlens array substrate 40 and the thin glass plate 49 can be bonded accurately.

Second Modification of Eighth Embodiment

In addition, FIG. 23 is an enlarged sectional view showing an active matrix substrate, a counter substrate, and a bonding structure of these substrates used in a liquid crystal device 1 according to a second modification of the eighth embodiment. Since the basic structure of the second modification is common to the eighth embodiment, the same components are indicated by the same reference numerals, and description thereof will be omitted. This modification differs from the eighth embodiment in that a center area of a pixel in the microlens 41 has a thin and flat shape, or has a shape such that the center area of the pixel has no microlens, and a bonding agent is formed thickly on a portion around the pixel from the center area toward the circumference.

In this case, assuming that the refractive index of a microlens array substrate 40 is $n_1$, and the refractive index of a bonding agent 48 is $n_2$, if the microlens array substrate 40 and the bonding agent 48 are formed by materials satisfying the relationship:

$$n_1 > n_2,$$

light traveling toward a light-shielding film or a wiring around the pixel can be directed toward the pixel center. Therefore, light utilization efficiency can be improved, and the amount of light incident from the opposite of the clear viewing direction can be decreased, so that display with high contrast can be effected.

In all of the eighth embodiment and the modifications thereof, the microlens is not formed on the center area of the pixel, but only on the peripheral area. Therefore, light utilization efficiency can be improved, and the amount of light incident from the opposite of the clear viewing direction can be decreased, so that display with high contrast can be effected.

The formations of the non-lens area 400 can be combined to apply to the above fourth to seventh embodiments.

Other Embodiments

If the above-described embodiments are combined, display with better contrast can be effected. While an example of six o'clock clear viewing has been described in the above embodiments, the clear viewing is not limited thereto. When the clear viewing direction is located in an oblique position of the substrate, such as a half-after-one clear viewing, or a half-after-ten clear viewing, for example, as described in the first to third embodiments, contrast can be improved by offsetting the center position of the opening ratio of the pixel or the optical center position of the microlens; however, contrast can also be improved by offsetting the center position upward, downward, leftward and rightward near the clear viewing direction.

In addition, if the light whose optical axis is inclined toward the clear viewing direction with respect to the normal line direction of the liquid crystal device is allowed to be incident on the liquid crystal device, the incidence of light from the opposite of the clear viewing direction can be effectively prevented, thereby making it possible to effect display with higher contrast.

Furthermore, while the first light-shielding film 6 of the active matrix substrate is formed on the lower layer of the TFT in the above-described embodiments, the formation is not limited thereto. For example, the first light-shielding film 6 may be formed on the upper layer of the TFT, or may be formed on the active matrix substrate utilizing light-shielding wiring.

Still furthermore, while the microlens is formed only on the counter substrate 30 into which light enters in the above-described embodiments, the microlens may be formed on the side of the active matrix substrate 20 from which light is emitted so as to oppose each pixel. In this case, the optical center position of the microlens formed on the active matrix substrate 20 may preferably be offset toward the clear viewing direction with respect to the center position 311 of the opening area 31 of the counter substrate 30. With this configuration, light with high contrast incident via the microlens formed on the counter substrate can be efficiently emitted by the microlens formed on the active matrix substrate 20. In addition, since the light to be emitted can be converged, collimated, or diffused in accordance with the optical system, the opening ratio of the pixel can be substantially increased, whereby light utilization efficiency can be improved.

Application of Liquid Crystal Device to Electronic Device

Next, an example of an electronic device which may consist of the liquid crystal device 1 of this embodiment will be described with reference to FIGS. 24 and 25. FIG. 24 is a block diagram of the electronic device. FIG. 25 is an explanatory view showing a principal part (optical system) of a projection display device as an example of the electronic device to which the present invention is applied.

In FIG. 24, the electronic device is composed of a display information output source 1000, a display information processing circuit 1002, a display driving circuit 1004, the liquid crystal device 1 of this embodiment, a clock generation circuit 1008, and a power circuit 1010. The display information output source 1000 includes a memory, such as a ROM and RAM, and a tuning circuit for tuning and outputting television signals, and outputs display information, such as video signals, based on a clock from the clock generation circuit 1008. The display information processing circuit 1002 processes and outputs the display information based on the clock from the clock generation circuit 1008. The display information processing circuit 1002 may include, for example, an amplifier/polarity reverse circuit, a serial-parallel conversion circuit, a rotation circuit, a gamma control circuit, a clamp circuit, and so forth. The display driving circuit 1004 is composed of a scanning-side driving circuit, and a data-side driving circuit, and display-drives the liquid crystal device 1. The power circuit 1010 supplies electric power to the above-described circuits.

First Example of Configuration of Projection Display Device

As an example of the electronic device having such a configuration, the projection display device will be described with reference to FIG. 25. As shown in FIG. 25, an optical unit is mounted in a housing of a projection display device 2001, and in the optical unit, there are configured a light source lamp 2011 (light source), an illuminating optical system 2015 which may consist of lenses 2012 and 2014, and a polarization conversion element 2016 consisting of an aggregate of a polarization separation film and a λ/4 phase plate, a color separation optical system 2020 for separating a white light beam emitted from the illuminating optical system 2015 into color light beams of red, green, and blue, three liquid crystal light valves 2030R, 2030G, and 2030B constituted by the liquid crystal device 1 of this embodiment serving as light valves for modulating the color light beams, a prism unit 2042 consisting of a dichroic prism serving as a color-synthesizing optical system for re-synthesizing modulated color light beams, and a projection lens unit 2050 (enlarging and projecting optical system) for enlarging and projecting a synthesized light beam onto a screen. As the light source lamp 2011, a halogen lamp, a metal halide lamp, a xenon lamp, and so forth can be used. Since the optical unit corresponds to a configuration such that, of p-polarized light and s-polarized light separated by each prism body in the polarization conversion element 2016, a λ/2 phase plate is arranged on an emitting position of the p-polarized light, the light beam can be arranged into s-polarized light.

The illuminating optical system 2015 includes a reflecting mirror 2017 so as to bend a central optical axis of the illuminating optical system 2015 perpendicularly toward the front of the device. In the color separation optical system 2020, a red-green reflecting dichroic mirror 2022, a green reflecting dichroic mirror 2024, and a reflecting mirror 2026 are arranged. A white light beam emitted from the light source lamp 2011 passes through the illuminating optical system 2015, and first, a red light beam R and a green light beam G contained in the white light beam are perpendicularly reflected by the red-green reflecting dichroic mirror 2022 and travel toward the green reflecting dichroic mirror 2024. A blue light beam B passes through the red-green reflecting dichroic mirror 2022, is perpendicularly reflected by the rearward reflecting minor 2026, and is emitted from an emitting section of the blue light beam toward the prism unit 2042. Of the red and green light beams R and G reflected by the red-green reflecting dichroic mirror 2022, only the green light beam G is perpendicularly reflected by the green reflecting dichroic mirror 2024, and is emitted from an emitting section of the green light beam toward the prism unit 2024. In contrast, the red light beam R passing through the green reflecting dichroic mirror 2024 is emitted from an emitting section of the red light beam toward a light guide system 2044. On the emitting side of the color light beams in the color separation optical system 2020, condenser lenses 2027R, 2027G, and 2027B are arranged, respectively. Accordingly, the color light beams emitted from the emitting sections enter the condenser lenses 2027R, 2027G, and 2027B to be condensed in the liquid crystal light valves 2030R, 2030G, and 2030B, respectively. In this way, in this embodiment, a light guide optical system for guiding the light emitted from the light source lamp 2011 to the liquid crystal light valves 2030R, 2030G, and 2030B while condensing the light is constituted by the illuminating optical system 2015, the color separation optical system 2020, the condenser lenses 2027R, 2027G, and 2027B, and the light guide system 2044.

Of the thus-condensed color light beams R, G, and B, the blue and green light beams B and G enter the liquid crystal light valves 2030B and 2030G, where they are modulated and given corresponding image information. That is, these light valves are subjected to switching control by a driving system (not shown) according to image information, whereby each color light passing therethrough are modulated. A known means can be used unchanged for such a driving means.

On the other hand, the red light beam R is guided to the liquid crystal light valve 2030R via the light guide system 2044, where it is similarly modulated according to the image information. In the light guide system 2044, there are arranged an incident-side lens 2045, an incident-side reflecting mirror 2046, an emitting-side reflecting mirror 2047, and intermediate lens 2048 arranged therebetween.

Next, the modulated color light beams through the respective liquid crystal light valves 2030B, 2030G and 2030R are incident on the prism unit 2042, where they are re-synthesized. A re-synthesized color image is enlarged and projected via the projection lens unit 2050 onto a screen (projection plane) located at a predetermined position. (Measure to Improve Contrast in Projection Display Device) Taking the projection display device 2001 configured as shown in FIG. 25 as an example, a configuration for improving contrast by correcting positions of a liquid crystal light valve and an optical component for guiding light to the liquid crystal light valve in accordance with visual angle characteristics of the liquid crystal device (liquid crystal light valve) will be described.

As shown by the one-dot chain line in FIG. 26, a liquid crystal light valve 2030B, a reflecting mirror 2026, and a condenser lens 2027B have been conventionally arranged in upright positions with respect to an end face of a prism unit 2042.

In this embodiment, however, as shown by the solid line in FIG. 26, the liquid crystal light valve 2030B is arranged in an oblique position of being offset back and forth in a direction of an optical axis L0. For this reason, the optical axis L0 of the light entering into the liquid crystal light valve 2030B is inclined toward a clear viewing direction (toward six o'clock) by a predetermined angle θ1 with respect to a normal line direction M of a light incident surface of a liquid crystal device 1. Accordingly, the amount of light incident on the liquid crystal light valve 2030B from the clear viewing direction can be increased, and the amount of light from opposite the clear viewing direction can be decreased, whereby display with high contrast can be effected in the liquid crystal light valve 2030B.

However, when the liquid crystal light valve 2030B is inclined too much, even if the light from the light source lamp 2011 is to be focused by the liquid crystal light valve 2030B, the liquid crystal light valve 2030B will be greatly offset from the focal position. As a result, in an image display area/f of the liquid crystal light valve 2030B, at a portion greatly offset from the focal point, the quality of an image is degraded.

Thus, in this embodiment, a condenser tens 2027B (see FIG. 25) used in a condenser optical system (light guide system 2044) is slightly tilted backward from the upright position shown by the one-dot chain line to be in an oblique upward position as shown by the solid line so that an optical axis of light entering into the liquid crystal light valve 2030B is further inclined toward the clear viewing direction with respect to the direction of the normal line M. Furthermore, in this embodiment, the reflecting mirror 2026 (see FIG. 25) used in the condenser optical system (light guide system 2044) is also slightly tilted backward from the upright position shown by the one-dot chain line to be in an oblique upward position as shown by the solid line so that the optical axis of the tight entering into the liquid crystal light valve 2030B is further inclined toward the clear viewing direction with respect to the direction of the normal line M.

For this reason, in this embodiment, even if an angle for inclining the liquid crystal light valve 2030B is limited from a viewpoint of preventing degradation of image quality caused by the offset between the focal position and the position of the liquid crystal light valve 2030B, whereby optimization of the direction of light with the configuration described in the first to eighth embodiments cannot be completely covered, such an insufficiency of inclination can be covered by the inclination of the reflecting mirror 2026 and the condenser lens 2027B of the light guide optical system. Therefore, according to this embodiment, light entering into the liquid crystal can be inclined toward the clear viewing direction to the most suitable condition.

While the inclination of the optical axis with respect to the liquid crystal light valve 2030B can be optimized by the condenser lens 2027B and the reflecting mirror 2026 as described above, the inclination of the optical axis with respect to the liquid crystal light valve 2030R can be effected by, for example, the condenser lens 2027R, the reflecting mirror 2047, and so forth, and the inclination of the optical axis with respect to the liquid crystal light valve 2030G can be effected by, for example, the condenser lens 2027G, the green reflecting dichroic mirror 2024, and so forth.

In addition, when a plurality of liquid crystal light valves (liquid crystal devices) are used as in the projection display device of this embodiment, an angle at which an optical axis of incident light is inclined with respect to the normal line direction of each liquid crystal light valve may preferably be optimized for each of the liquid crystal light valves 2030R, 2030G, and 2030B. When configuring in this way, the liquid crystal light valves 2030R, 2030G, and 2030B may preferably be equally inclined, and the corresponding condenser lenses and reflecting mirrors may preferably be optimized for each of the colors.

Industrial Applicability

As described above, in the liquid crystal device according to the present invention, of the light incident from the directions inclined in the clear viewing direction and opposite to the clear viewing direction, light incident from the direction inclined toward opposite to the clear viewing direction is prevented from contributing the display, so that display with high contrast can be effected. Therefore, in a projection display device or the like, a high-quality image can be displayed.

What is claimed is:

1. A liquid crystal device comprising:

a first substrate formed with a plurality of pixels on a first planar surface, each pixel having a pixel electrode formed thereon;

a second substrate having a second planar surface opposing the first planar surface of the first substrate and separated by a gap normal to the first and second planar surfaces;

liquid crystal sandwiched between the first substrate and the second substrate; and a first alignment layer formed between the liquid crystal and the first substrate and a second alignment layer formed between the liquid crystal and the second substrate, the first and second alignment layers aligning the liquid crystal such that there is a clear viewing direction through the liquid crystal and both of the substrates, the clear viewing direction having a coplanar component and a normal component, the coplanar component being parallel to one of the first and second planar surfaces, the normal component parallel to the gap, the first substrate and the second substrate transmitting, of light incident through one of the substrates, light incident from the clear viewing direction greater than light incident from another direction having a component opposite to the coplanar component of the clear viewing direction.

2. The liquid crystal device according to claim 1, the one substrate comprising a light-shielding film formed in a matrix that overlaps an area corresponding to an area between adjacent pixel electrodes.

3. The liquid crystal device according to claim 1, the first substrate and the second substrate comprising a first opening area and a second opening area for each pixel, and of the first opening area and the second opening area, a center position of the opening area formed in the one substrate being offset toward the clear viewing direction with respect to a center position of the opening area formed in another substrate from which light is emitted.

4. The liquid crystal device according to claim 3, the one substrate comprising a microlens so as to oppose each pixel, and an optical center position of the microlens being arranged so as to substantially coincide with the center position of the opening area of the one substrate.

5. The liquid crystal device according to claim 1, the one substrate comprising a microlens so as to oppose each pixel, and an optical center position of the microlens being offset toward the clear viewing direction with respect to a center position of an opening area of another substrate.

6. The liquid crystal device according to claim 5, of the first substrate and the second substrate, the other substrate from which light is emitted comprising a microlens so as to oppose each pixel.

7. The liquid crystal device according to claim 6, an optical center position of the microlens formed on the other substrate being offset toward the clear viewing direction with respect to a center position of the opening area of the one substrate.

8. The liquid crystal device according to claim 3, the first substrate and the second substrate comprising a first light-shielding film and a second light-shielding film formed in a matrix, respectively, that overlap an area corresponding to an area between adjacent pixel electrodes, the first opening area and the second opening area being partitioned and formed in a matrix for each pixel by the first light-shielding film and the second light-shielding film.

9. The liquid crystal device according to claim 8, of the first light-shielding film and the second light-shielding film, the light-shielding film formed on the one substrate broadly overlapping the opening area formed in the other substrate at a side opposite the clear viewing direction compared to a side of the clear viewing direction, of the first opening area and the second opening area, a center position of the opening area formed in the one substrate being offset toward the clear viewing direction with respect to the center position of the opening area formed in the other substrate.

10. The liquid crystal device according to claim 8, of the first light-shielding film and the second light-shielding film, the light-shielding film formed on the other substrate broadly overlapping the opening area formed in the one substrate at a side of the clear viewing direction compared to a side opposite the clear viewing direction, of the first opening area and the second opening area, the center position of the opening area formed in the one substrate being offset toward the clear viewing direction with respect to the center position of the opening area formed in the other substrate.

11. The liquid crystal device according to claim 1, further comprising an asymmetric microlens, that transmits a larger amount of light incident on the one substrate from the clear viewing direction to the liquid crystal than an amount of light incident on the one substrate from opposite the clear viewing direction, formed in an area of the one substrate opposing each pixel.

12. The liquid crystal device according to claim 1, further comprising a high-refractive index layer formed on a side of a light incident surface of the one substrate, a low-refractive index layer formed on a side of a light emitting surface of the one substrate, and a microlens formed in an area of the one substrate opposing each pixel, the low-refractive index layer increasing in thickness from a center of the pixel toward the clear viewing direction and being reduced in thickness toward the opposite of the clear viewing direction.

13. The liquid crystal device according to claim 1, further comprising a low-refractive index layer formed on a light incident-side of the one substrate, a high-refractive index layer formed on a light emitting-side of the one substrate, and a microlens formed in an area of the one substrate opposing each pixel, the high-refractive index layer reducing in thickness from a center of the pixel toward the clear viewing direction and increased in thickness toward the opposite of the clear viewing direction.

14. The liquid crystal device according to claim 1, further comprising a medium-refractive index layer formed on a light incident-side of the one substrate, a low-refractive index layer formed at a side of the clear viewing direction on a light emitting-side of the substrate, a high-refractive index layer adjacent to the low-reflective index layer at the side opposite the clear viewing direction on the light emitting-side of the substrate, and a microlens formed in an area of the one substrate opposing each pixel, the low-refractive index layer and the high-refractive index layer increasing in thickness from a center of the pixel toward the clear viewing direction and the opposite of the clear viewing direction, respectively.

15. The liquid crystal device according to claim 1, further comprising a medium-refractive index layer formed on a light incident-side of the one substrate, a high-refractive index layer formed at a side of the clear viewing direction on a light emitting-side of the substrate, a low-refractive index layer adjacent to the high-reflective index layer at a side opposite the clear viewing direction on the light emitting-side of the substrate, and a microlens formed in an area of the one substrate opposing each pixel, the high-refractive index layer and the low-refractive index layer reducing in thickness from a center of the pixel toward the clear viewing direction and the opposite of the clear viewing direction, respectively.

16. The liquid crystal device according to claim 15, further comprising a non-lens area that allows light perpendicularly incident on the one substrate to travel in a straight line toward the liquid crystal formed on a center of the pixel.

17. The liquid crystal device according to claim 16, the one substrate comprising a microlens substrate formed with the microlens, and a thin plate bonded to the microlens substrate via a bonding agent, the microlens comprising a convex shape having a flat surface that forms the non-lens area in the center of the pixel, and the microlens substrate and the thin plate being bonded with the thin plate abutted against the flat surface.

18. The liquid crystal device according to claim 1, the first substrate comprising a plurality of scanning lines and a plurality of data lines, the scanning lines and the data lines being connected to a pixel switching element, and the pixel switching element being connected to the pixel electrode.

19. The liquid crystal device according to claim 1, the one substrate being the second substrate.

20. The liquid crystal device according to claim 19, the first substrate comprising a plurality of scanning lines and a plurality of data lines, and the pixel electrode being connected to the scanning lines and the data lines via a pixel switching element, and the pixel switching element being formed on a side of the clear viewing direction in the pixel with respect to the pixel electrode.

21. The liquid crystal device according to claim 19, in each pixel, each of the scanning lines corresponding to the pixel, the liquid crystal device further comprising a capacitor line that forms a storage capacitor formed on the side of the clear viewing direction.

22. A projection display device using the liquid crystal device defined by claim 1, comprising:

a light source;

a condenser optical system that guides light emitted from the light source to the liquid crystal; and an enlarging and projecting optical system that enlarges and projects the light modulated by the liquid crystal device.

23. The projection display device according to claim 22, an optical axis of light incident on the liquid crystal device being inclined toward the clear viewing direction with respect to a normal line direction of the liquid crystal device.

24. The projection display device according to claim 23, the liquid crystal device being arranged in an oblique position to incline the optical axis of the light incident on the liquid crystal toward the clear viewing direction with respect to the normal line direction of the liquid crystal device.

25. The projection display device according to claim 23, a condenser lens used in the condenser optical system being arranged in an oblique position to incline the optical axis of the light incident on the liquid crystal toward the clear viewing direction with respect to the normal line direction of the liquid crystal device.

26. The projection display device according to claim 25, further comprising a reflecting mirror used in the condenser optical system arranged in an oblique position to incline the optical axis of the light incident on the liquid crystal toward the clear viewing direction with respect to the normal line direction of the liquid crystal device.

27. The projection display device according to claim 23, a plurality of liquid crystal devices being used, and an angle of the optical axis of the incident light inclined with respect to the normal line direction of a liquid crystal device being set to a predetermined value for each of the plurality of liquid crystal devices.

28. A liquid crystal device comprising:

a first substrate formed with a plurality of pixels;

a second substrate opposing the first substrate; and liquid crystal sandwiched between the first substrate and the second substrate, the liquid crystal having an alignment state that produces a clear viewing direction through the liquid crystal, wherein the first substrate and the second substrate are formed with a first opening area and a second opening area for each pixel, and wherein, of the first opening area and the second opening area, a center position of the opening area formed in one of the first substrate and the second substrate is offset toward the clear viewing direction with respect to a center position of the opening area formed in another substrate from which light is transmitted.

29. A liquid crystal device comprising:

a first substrate formed with a plurality of pixels;

a second substrate opposing the first substrate;

liquid crystal sandwiched between the first substrate and the second substrate, the liquid crystal having an alignment state that produces a clear viewing direction through the liquid crystal;

a first alignment layer formed between the liquid crystal and the first substrate, and a second alignment layer formed between the liquid crystal and the second substrate, the first and second alignment layers aligning the liquid crystal into an alignment state that produces contrast characteristics showing directivity with a higher contrast ratio in a clear viewing direction than in a direction opposite of the clear viewing direction, wherein the first substrate and the second substrate are formed with a first opening area and a second opening area defined by a first unopened area and a second unopened area, respectively for each pixel, and wherein, one of the first substrate and the second substrate irradiated with incident light is formed with a microlens so as to oppose each pixel, and the microlens refract incident light from the clear viewing direction toward one of the first and second opening areas, and a part of the incident light from the direction opposite of the clear viewing direction toward one of the first and second unopened areas.

30. A liquid crystal device comprising:

a first substrate formed with a plurality of pixels;

a second substrate opposing the first substrate;

liquid crystal sandwiched between the first substrate and the second substrates; and a first alignment layer formed between the liquid crystal and the first substrate, and a second alignment layer, formed between the liquid crystal and the second substrate, the first and second alignment layers aligning the liquid crystal into an alignment state that produces contrast characteristics showing directivity with a higher contrast ratio in a clear viewing direction than in a direction opposite of the clear viewing direction, wherein the first substrate and the second substrate are formed with a first opening area and a second opening area for each pixel, and wherein, one of the first substrate and the second substrate irradiated with incident light is formed with a microlens so as to oppose each pixel, and an optical center position of the microlens is offset, toward the clear viewing direction, from a center position of an opening area formed in at least one of the first and second substrates.

31. A liquid crystal device comprising:

a first substrate formed with a plurality pixel electrode defining pixels;

a second substrate opposing the first substrate;

liquid crystal sandwiched between the first substrate and the second substrate;

a first alignment layer formed between the liquid crystal and the first substrate, and a second alignment layer formed between the liquid crystal and the second substrate, the first and second alignment layers aligning the liquid crystal therebetween into an alignment state that produces contrast characteristics showing directivity with a higher contrast ratio in a clear viewing direction than in a direction opposite of the clear viewing direction; and an element that prevents light incident on the first substrate from the opposite direction from passing through to the second substrate.

32. The liquid crystal device according to claim 28, wherein for each pixel the first opening area in the first substrate includes a first center position and the second opening area in the second substrate includes a second center position, wherein the clear viewing direction has a viewing direction component parallel to at least one opening area of the first opening area and the second opening area, the opposite direction has an opposite direction component being opposite to the viewing direction component, and wherein one of the center positions of the first and second opening areas is offset in the viewing direction component parallel to the opening area toward the clear viewing direction with respect to the other center position of the opening area formed in the other substrate through which light is transmitted.

* * * * *